United States Patent
Lee et al.

(10) Patent No.: US 8,351,502 B2
(45) Date of Patent: Jan. 8, 2013

(54) METHOD AND APPARATUS FOR ADAPTIVELY SELECTING CONTEXT MODEL FOR ENTROPY CODING

(75) Inventors: Bae-keun Lee, Bucheon-si (KR); Kyo-hyuk Lee, Seoul (KR); Sang-chang Cha, Hwaseong-si (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1461 days.

(21) Appl. No.: 11/405,665

(22) Filed: Apr. 18, 2006

(65) Prior Publication Data

US 2006/0233254 A1    Oct. 19, 2006

Related U.S. Application Data

(60) Provisional application No. 60/672,549, filed on Apr. 19, 2005, provisional application No. 60/701,987, filed on Jul. 25, 2005, provisional application No. 60/702,296, filed on Jul. 26, 2005, provisional application No. 60/702,624, filed on Jul. 27, 2005.

(30) Foreign Application Priority Data

Jul. 1, 2005   (KR) .................. 10-2005-0059371
Sep. 21, 2005  (KR) .................. 10-2005-0087761

(51) Int. Cl.
*H04N 7/12*     (2006.01)
*H04N 11/02*    (2006.01)
*H04N 11/04*    (2006.01)

(52) U.S. Cl. ................................... 375/240.12

(58) Field of Classification Search ............. 375/240.12
See application file for complete search history.

(56) References Cited

U.S. PATENT DOCUMENTS

| 6,330,280 | B1 | 12/2001 | Suzuki et al. | |
| 7,733,963 | B2 * | 6/2010 | Park et al. ................ | 375/240.25 |
| 2002/0118742 | A1 | 8/2002 | Puri et al. | |
| 2003/0007557 | A1 | 1/2003 | Katata et al. | |
| 2003/0118099 | A1 * | 6/2003 | Comer et al. .............. | 375/240.2 |

(Continued)

FOREIGN PATENT DOCUMENTS

EP     1 422 828 A1    5/2004

(Continued)

OTHER PUBLICATIONS

Sean Anderson; "Bit Twiddling Hacks"; Aug. 15, 2001; Stanford Computer Science available at http://graphics.stanford.edu/~seander/bithacks.html#CountBitsSetNaive.*

(Continued)

*Primary Examiner* — Andy Rao
*Assistant Examiner* — Jeremaiah Hallenbeck-Huber
(74) *Attorney, Agent, or Firm* — Sughrue Mion, PLLC

(57) ABSTRACT

A method and apparatus for adaptively selecting a context model for entropy coding and a video decoder are provided. A method of coding a residual prediction flag indicating whether residual data for an enhancement layer block of a multi-layered video signal is predicted from residual data for a lower layer block corresponding to the residual data for the enhancement layer block includes the steps of calculating the energy of the residual data for the lower layer block, determining a coding method for the residual prediction flag according to the energy, and coding the residual prediction flag using the determined coding method.

72 Claims, 17 Drawing Sheets

U.S. PATENT DOCUMENTS

| | | | |
|---|---|---|---|
| 2003/0223493 A1 | 12/2003 | Ye et al. | |
| 2004/0042549 A1 | 3/2004 | Huang | |
| 2005/0008240 A1* | 1/2005 | Banerji et al. | 382/238 |
| 2005/0157797 A1* | 7/2005 | Gaedke | 375/240.24 |
| 2006/0036924 A1 | 2/2006 | Ghosh | |
| 2006/0153294 A1* | 7/2006 | Wang et al. | 375/240.08 |
| 2006/0153295 A1* | 7/2006 | Wang et al. | 375/240.08 |
| 2006/0153300 A1* | 7/2006 | Wang et al. | 375/240.16 |

FOREIGN PATENT DOCUMENTS

| | | |
|---|---|---|
| JP | 11-252573 A | 9/1999 |
| JP | 2005-057789 A | 3/2005 |
| KR | 10-2005-0019807 A | 3/2005 |
| RU | 2001/0123542 A | 2/2007 |
| WO | 00/05898 A2 | 2/2000 |
| WO | WO 01/26381 A1 | 4/2001 |
| WO | WO 0243398 A1 | 5/2002 |
| WO | WO 2004/073312 A1 | 8/2004 |
| WO | WO 2006/075240 A1 | 7/2006 |

OTHER PUBLICATIONS

Russian Office Action dated Nov. 16, 2007 (Application No. 2006113092/09 (014239)).

Official Action dated Jun. 22, 2007 for Russian Application No. 2006113092/09(014239).

Flierl, M.; Girod, B. 'Generalized B pictures and the draft H.264/AVC video-compression standard' In : Circuits and Systems of Video Technology, IEEE Transactions on vol. 13, Issue 7, Jul. 2003 pp: 587-597.

Xiaolin Wu; Jian-Huo Chen 'Context modeling and entropy coding of wavelet coefficients for image compression' In : Acoustics, Speech, and Signal Processing, 1997, ICASSP-97., 1997 IEEE International Conference on vol. 4, Apr. 21-24, 1997 pp. 3097-3100 vol. 4.

Coban, M.Z.; Mersereau, R.M. 'Low bit-rate subband video coding using context models' In : Image Processing, 2000. Proceedings. 2000 International Conference on vol. 2, Sep. 10-13, 2000 pp. 836-839 vol. 2.

Schwarz, H. et al.: "SVC Core Experiment 2.1: Inter-layer prediction of motion and residual data", ISO/IEC JTC1/SC29/WG11 M11043, XX, XX, No. M11043, Jul. 23, 2004, pp. 1-6, XP002360488.

Description of core experiments in SVC, ISO/IEC JTC1/SC29/WG11 N6898, XX, XX, Jan. 2005 (Jan. 2001), page complete XP002340411, paragraph [0012].

* cited by examiner

METHOD AND APPARATUS FOR ADAPTIVELY SELECTING CONTEXT MODEL FOR ENTROPY CODING

CROSS-REFERENCE TO RELATED APPLICATIONS

This application claims priority from Korean Patent Application Nos. 10-2005-0059371 and 10-2005-0087761, filed on Jul. 1, 2005 and Sep. 21, 2005, respectively, and U.S. Provisional Patent Application Nos. 60/672,549, 60/701,987, 60/702,296 and 60/702,624, filed on Apr. 19, 2005, Jul. 25, 2005, Jul. 26, 2005 and Jul. 27, 2005, respectively, the whole disclosures of which are hereby incorporated herein by reference.

BACKGROUND OF THE INVENTION

1. Field of the Invention

Methods and apparatuses consistent with the present invention relate to coding and decoding of a video signal, and more particularly, to adaptively selecting a context model for entropy coding and a video decoder.

2. Description of the Related Art

With the development of information communication technology, including the Internet, there have been increasing multimedia services containing various kinds of information such as text, video, audio and so on. Multimedia data requires a large capacity of storage media and a wide bandwidth for transmission since the amount of multimedia data is usually large. Accordingly, a compression coding method is a requisite for transmitting multimedia data including text, video and audio.

A basic principle of data compression is removing data redundancy. Data can be compressed by removing spatial redundancy in which the same color or object is repeated in an image, temporal redundancy in which there is little change between adjacent frames in a moving image or the same sound is repeated in audio, or mental visual redundancy which takes into account human eyesight and its limited perception of high frequency. In general video coding, temporal redundancy is removed by motion compensation based on motion estimation and compensation, and spatial redundancy is removed by transform coding.

To transmit multimedia generated after removing data redundancy, transmission media are necessary. Transmission performance is different depending on transmission media. Currently used transmission media have various transmission rates. For example, an ultrahigh-speed communication network can transmit data of several tens of megabits per second while a mobile communication network has a transmission rate of 384 kilobits per second. Accordingly, to support transmission media having various speeds or to transmit multimedia at a data rate suitable to a transmission environment, data coding methods having scalability, such as wavelet video coding and sub-band video coding, may be suitable to a multimedia environment.

Scalable video coding is a technique that allows a compressed bitstream to be decoded at different resolutions, frame rates and signal-to-noise ratio (SNR) levels by truncating a portion of the bitstream according to ambient conditions such as transmission bit-rates, error rates and system resources. Motion Picture Experts Group 4 (MPEG-4) Part 10 standardization for scalable video coding is under way. In particular, much effort is being made to implement scalability based on a multi-layered structure. For example, a bitstream may consist of multiple layers, i.e., a base layer and first and second enhanced layers with different resolutions (QCIF, CIF, and 2CIF) or frame rates.

Like when a video is coded into a singe layer, when a video is coded into multiple layers, a motion vector (MV) is obtained for each of the multiple layers to remove temporal redundancy. The motion vector MV may be separately searched for each layer (i.e., in the former case) or a motion vector obtained by a motion vector search for one layer is used for another layer (without or after being upsampled/downsampled) (i.e., in the latter case). In the former case, however, in spite of the benefit obtained from accurate motion vectors, there still exists overhead due to motion vectors generated for each layer. Thus, it is a very challenging task to efficiently remove redundancy between motion vectors for each layer.

FIG. 1 shows an example of a scalable video codec using a multi-layer structure. Referring to FIG. 1, a base layer has a Quarter Common Intermediate Format (QCIF) resolution and a frame rate of 15 Hz, a first enhancement layer has a Common Intermediate Format (CIF) resolution and a frame rate of 30 Hz, and a second enhancement layer has a Standard Definition (SD) resolution and a frame rate of 60 Hz. For example, in order to obtain CIF 0.5 Mbps stream, a first enhancement layer bitstream (CIF_30 Hz_0.7 M) is truncated to match a target bit-rate of 0.5 M. In this way, it is possible to provide spatial temporal, and signal-to-noise ratio (SNR) scalabilities.

As shown in FIG. 1, frames (e.g., 10, 20, and 30) at the same temporal position in each layer can be considered to be similar images. One known coding technique includes predicting texture of current layer from texture of a lower layer (directly or after upsampling) and coding a difference between the predicted value and actual texture of the current layer. This technique is defined as Intra_BL prediction in Scalable Video Model 3.0 of ISO/IEC 21000-13 Scalable Video Coding ("SVM 3.0").

The SVM 3.0 employs a technique for predicting a current block using correlation between a current block and a corresponding block in a lower layer in addition to directional intra prediction and Inter prediction used in conventional H.264 to predict blocks or macroblocks in a current frame. The prediction method is called an "Intra_BL prediction" and a coding mode using the Intra_BL prediction is called an "Intra_BL mode".

FIG. 2 is a schematic diagram for explaining the above three prediction methods: ① an Intra prediction for a macroblock 14 in a current frame 11; ② an Inter prediction using a frame 12, which includes a corresponding macroblock 15, at a different temporal position than the current frame 11; and ③ an Intra_BL prediction using texture data from a region 16 in a base layer frame 13 corresponding to the macroblock 14.

The scalable video coding standard selects an advantageous method of the three prediction methods for each macroblock.

In order to provide information about selected prediction method or data used for the selected prediction method to a decoder, a variety of flags can be used. One bit, several bits, and several ten bits may be used as flags depending on whether coding is performed on a macroblock-by-macroblock, slice-by-slice or frame-by-frame basis. The size of data increases when the flags are set for each macroblock, slice, or frame in the entire moving picture.

Accordingly, a need exists for a method and an apparatus for efficiently compressing the flags.

SUMMARY OF THE INVENTION

The present invention provides a method and apparatus for reducing the amount of data required for prediction using base layer data.

The above stated aspect as well as other aspects, features and advantages, of the present invention will become clear to those skilled in the art upon review of the following description.

According to an aspect of the present invention, there is provided a method of coding a residual prediction flag indicating whether residual data for an enhancement layer block of a multi-layered video signal is predicted from residual data for a lower layer block corresponding to the residual data for the enhancement layer block, the method comprising calculating the energy of the residual data for the lower layer block, determining a coding method for the residual prediction flag according to the energy, and coding the residual prediction flag using the determined coding method.

According to another aspect of the present invention, there is provided a method of coding a residual prediction flag indicating whether residual data for an enhancement layer block of a multi-layered video signal is predicted from residual data for a lower layer block corresponding to the residual data for the enhancement layer block, the method comprising calculating a value of coded block pattern (CBP) of the lower layer block, determining a coding method for the residual prediction flag according to the calculated value of the CBP, and coding the residual prediction flag using the determined coding method.

According to still another aspect of the present invention, there is provided a method of decoding a residual prediction flag indicating whether residual data for an enhancement layer block of a multi-layered video signal is predicted from residual data for a lower layer block corresponding to the residual data for the enhancement layer block, the method comprising calculating the energy of the residual data for the lower layer block, determining a decoding method for the residual prediction flag according to the energy, and decoding the residual prediction flag using the determined decoding method.

According to yet another aspect of the present invention, there is provided a method of decoding a residual prediction flag indicating whether residual data for an enhancement layer block of a multi-layered video signal is predicted from residual data for a lower layer block corresponding to the residual data for the enhancement layer block, the method comprising calculating a value of a CBP of the lower layer block, determining a decoding method for the residual prediction flag according to the calculated value of the CBP, and decoding the residual prediction flag using the determined decoding method.

According to a further aspect of the present invention, there is provided a method of decoding a residual prediction flag indicating whether residual data for an enhancement layer block of a multi-layered video signal is predicted from residual data for a lower layer block corresponding to the residual data for the enhancement layer block, the method comprising checking a value of a CBP in the lower layer block, determining whether or not each bit of the CBP in the lower layer block has a value of '1,' determining a decoding method for the residual prediction flag according to whether at least one bit of the CBP in the lower layer block has a value of '1,' and decoding the residual prediction flag according to the determined decoding method.

According to yet a further aspect of the present invention, there is provided a method of decoding an enhancement layer of a multi-layered video signal comprising determining a decoding method for the residual prediction flag indicating whether the enhancement layer is predicted from a lower layer using the value of a CBP of the lower layer, and decoding the residual prediction flag using an entropy decoding method selected according to the decoding method and decoding the enhancement layer using the residual prediction flag.

According to still yet another aspect of the present invention, there is provided a decoder for decoding a residual prediction flag indicating whether residual data for an enhancement layer block of a multi-layered video signal is predicted from residual data for a lower layer block corresponding to the residual data for the enhancement layer block, the decoder comprising a parser which parses the value of a CBP for the lower layer block, and a decoding unit which determines a decoding method for the residual prediction flag according to the value of the CBP and decodes the residual prediction flag using the determined decoding method.

According to still yet a further aspect of the present invention, there is provided a decoder for decoding an enhancement layer of a multi-layered video signal comprising a parser which parses a value of a CBP for a lower layer than the enhancement layer, an entropy decoding unit which determines a decoding method for a residual prediction flag indicating whether the enhancement layer is predicted from the lower layer using the value of the CBP and performs entropy decoding on the residual prediction flag according to the decoding method and then the enhancement layer, an inverse quantizer which inversely quantizes the enhancement layer, and an inverse transformer which performs inverse transform on the inversely quantized enhancement layer and performs decoding on the result using prediction from the lower layer according to the residual prediction flag.

According to another aspect of the present invention, there is provided a coding method performed by a multi-layered video encoder, the coding method comprising obtaining a base layer frame from an input frame, obtaining data for an enhancement layer from the input frame by referring to the base layer frame, and coding the data for the enhancement layer according to the result of determining whether the data for the enhancement layer is to be predicted from data for the base layer frame.

According to still another aspect of the present invention, there is provided a decoding method performed by a multi-layered video decoder, the decoding method comprising decoding an input base layer frame, determining whether data for the base layer frame is needed to predict enhancement layer data, and decoding the data for the enhancement layer according to the result of determination.

According to yet another aspect of the present invention, there is provided a video encoder comprising a base layer encoder which obtains a base layer frame from an input frame, and an enhancement layer encoder which generates data for an enhancement layer being predicted from the base layer frame from the input frame, wherein the enhancement layer encoder comprises a transformer which codes the data for the enhancement layer according to the result of determining whether the data for the enhancement layer is predictable from data for the base layer frame.

According to a further aspect of the present invention, there is provided a video decoder comprising a base layer decoder which decodes an input base layer frame, and an enhancement layer decoder which decodes data for an enhancement layer by referring to the base layer frame, wherein the enhancement layer decoder comprises an inverse transformer which decodes the data for the enhancement layer according to the result of determining whether data for the decoded base layer frame is needed to predict the data for the enhancement layer being predicted from the base layer frame.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

Figure 1:
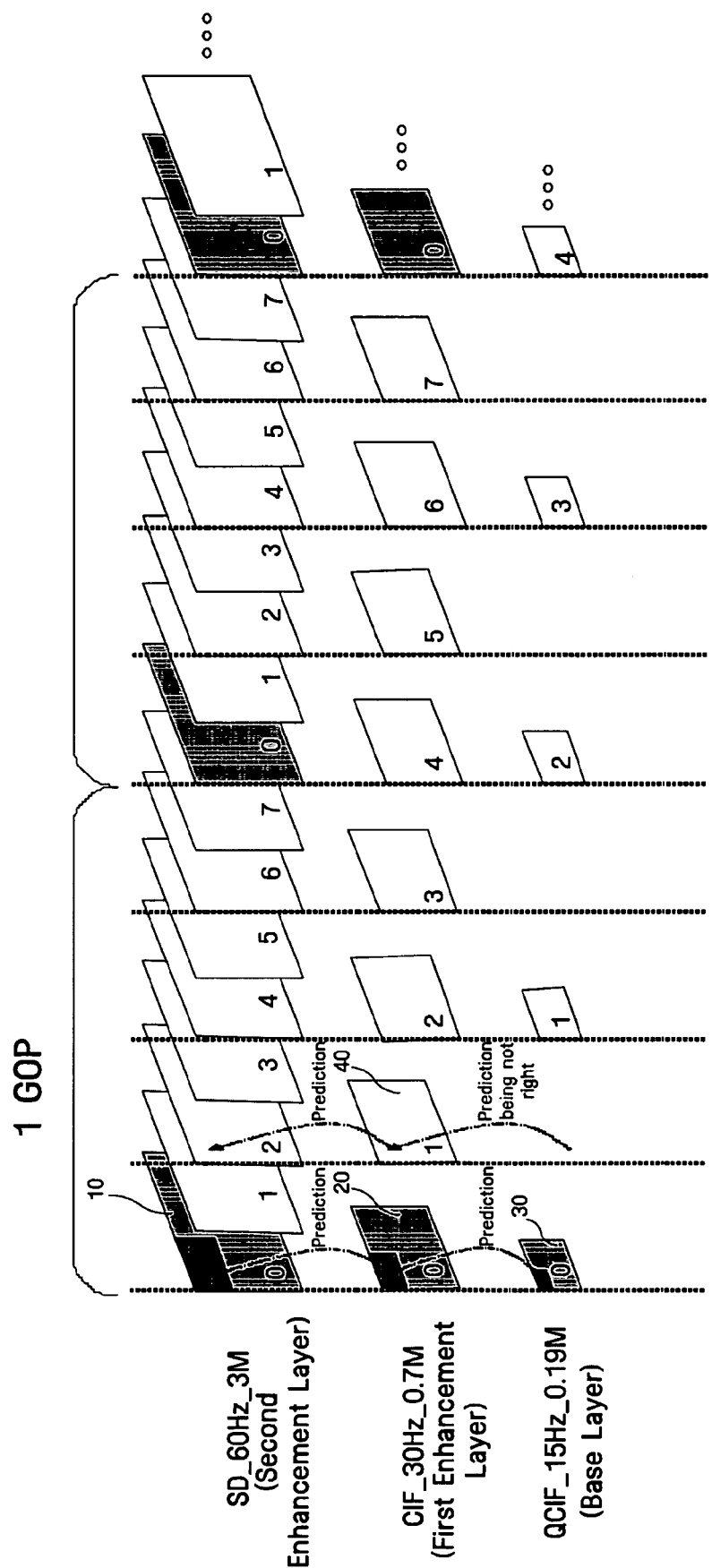
FIG. 1 illustrates an example of a scalable video codec using a multi-layer structure.

The present invention will now be described more fully with reference to the accompanying drawings, in which exemplary embodiments of the invention are shown.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of methods according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 2:
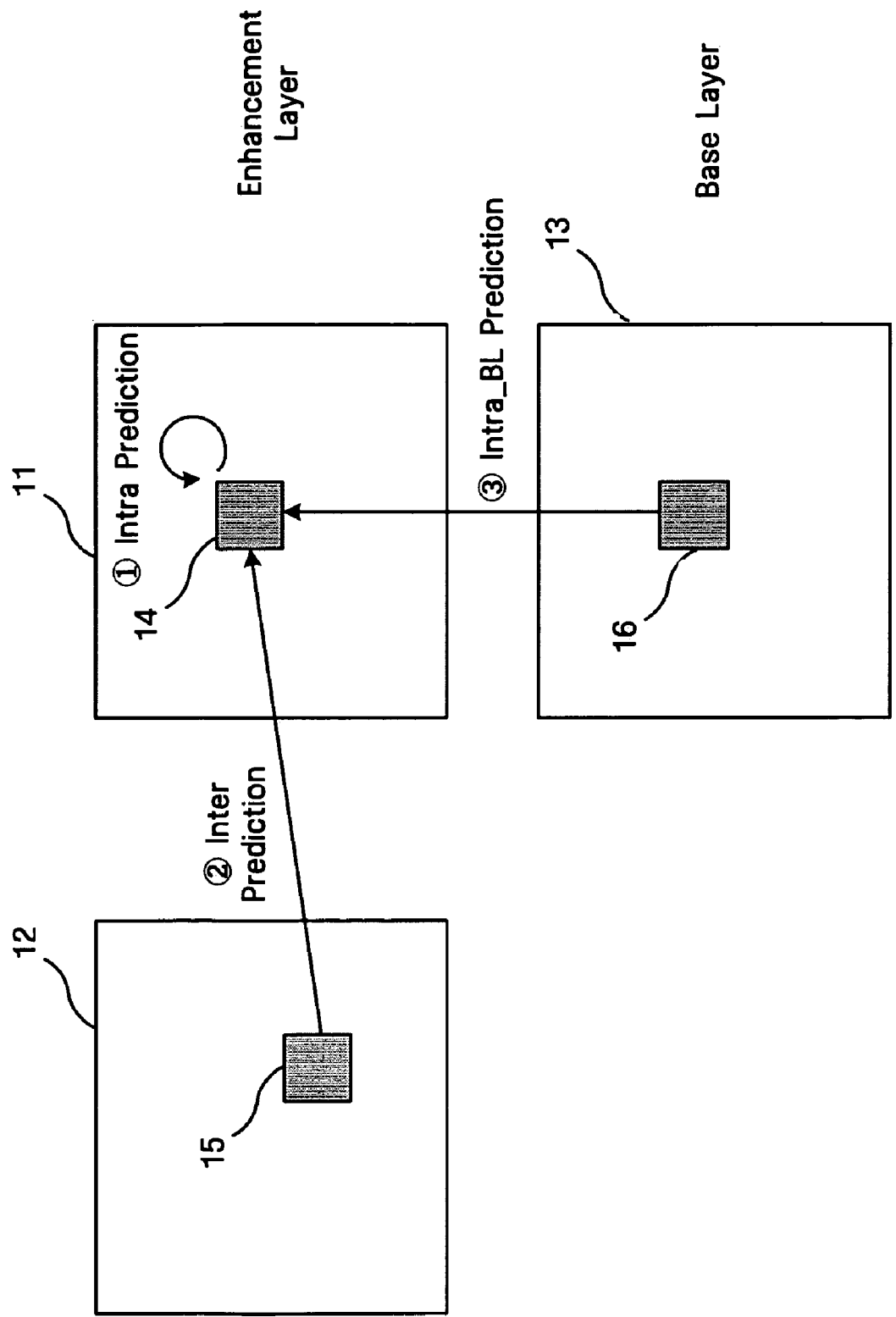
FIG. 2 is a schematic diagram for explaining Inter prediction, Intra prediction, Intra-BL prediction.

Information concerning the prediction methods shown in FIG. 2, that is, data regarding one selected method among the prediction methods shown in FIG. 2, or information concerning reference data, are set by an encoder and transmitted to be used by a decoder. Entropy coding is performed to finally losslessly compress data. Huffman coding is commonly used as an entropy coding method. Huffman coding is a form of parameter length coding and is dependent on bit allocation of data based on data probabilities. Thus, in order to increase the overall bit efficiency, a data representation method can be modified.

One way of notifying the decoder of the prediction method selected among the prediction methods illustrated in FIG. 2 is the use of a prediction flag which indicates that the selected method has referred to base layer information, for example, residual data or motion vectors of a base layer. As prediction flag, a residual prediction flag or a motion prediction flag may be used to inform the decoder whether base layer information has been referred to. Because the prediction flags are always set for each macroblock, each slice, or each frame, it is important to reduce the size of flags or increase compression efficiency during coding such as entropy coding. To achieve this purpose, information is set for the decoder to predict the prediction flags and reconstruct the prediction flags using the information.

Figure 3:
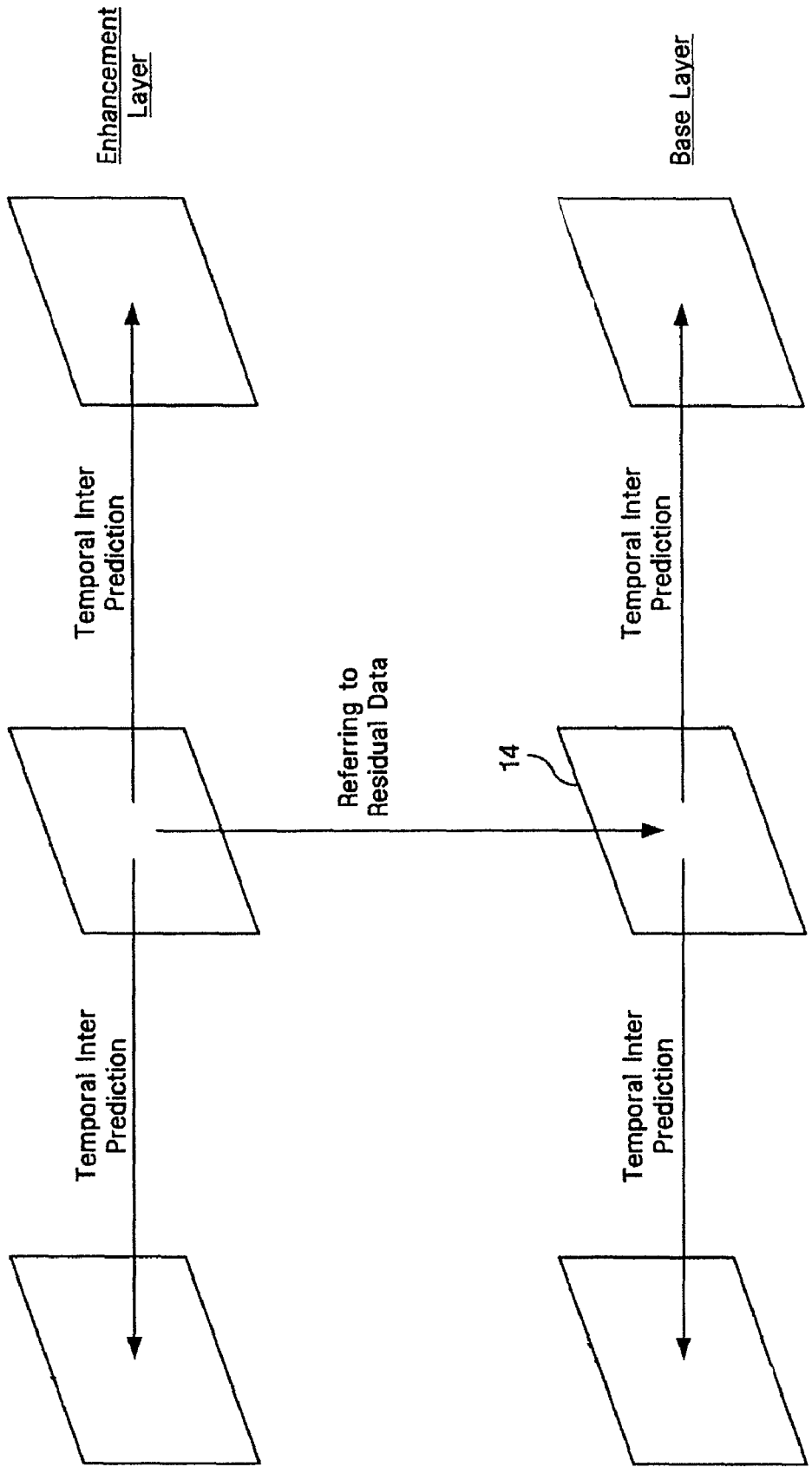
FIG. 3 is a diagram showing an example of residual prediction in video coding.

FIG. 3 illustrates an example of residual prediction in video coding. Residual prediction refers to prediction performed on residual data predicted using one selected among the prediction methods illustrated in FIG. 2. A macroblock (slice, or frame) 14 in a base layer can be constructed from one selected among the prediction methods illustrated in FIG. 2, e.g., a temporal inter prediction, using residual data. In this case, residual prediction can also be performed on a macroblock, slice, or frame in an enhancement layer using base layer residual data. While the invention will be described hereinafter with regard to a macroblock, it is not limited thereto and can be applied to a slice or a frame.

In order for a macroblock in an enhancement layer to implement temporal inter prediction, a base layer residual may be referred to. To notify a decoder that the base layer residual has been referred to in temporal inter prediction, a residual prediction flag (residual predication flag) is set to 1. If values of macroblocks in the base layer, (i.e. macroblocks containing residual data) are all set to zero, the number of non-zero pixels is smaller than a predetermined threshold or the CBP is zero or smaller than a predetermined threshold, it is not necessary to set a residual prediction flag value. This means that there is little motion as a result of temporal inter prediction on the base layer. That is, because there is no or insufficient reference data for the macroblock in an enhancement layer to refer to, the coding of the residual prediction flag is skipped, thereby saving the number of bits required for setting the residual prediction flag value.

Residual prediction is meaningful in a case where motion vectors in an enhancement layer are similar to those in a base layer. Thus, obtaining a difference between motion vectors for the two layers may be a fundamental issue in predicting a value of a residual prediction flag. For brevity, determination information for predicting a value of a residual prediction flag will be hereinafter referred to as a "prediction determination flag". In the Joint Scalable Video Model (JSVM) 1, improved efficiency of entropy coding can be achieved by coding a difference between a residual prediction flag and a prediction determination flag, labeled PrdRpFlag, rather than by setting the residual prediction flag. Therefore, such a residual predication difference flag, labeled residual_predication_flag_diff, has been introduced to encode video information.

A method of obtaining the residual predication difference flag will now be described.

First, if the number of non-zero pixels present in a base layer residual is smaller than a threshold, the coding of the residual prediction flag is skipped.

Conversely, if the number of non-zero pixels is greater than the threshold, the residual predication difference flag, not the residual prediction flag, is coded. To obtain the residual prediction difference flag, a residual between a base layer motion vector BaseMV and an enhancement or current layer motion vector CurrMV is used. To encode the residual prediction difference flag, the determination flag must be obtained.

The above process can be summarized as follows.

If |BaseMV−CurrMV| is smaller than a predetermined threshold, the determination flag is set to 1; otherwise, it is set to 0. Then, the residual predication difference flag that is the difference between the calculated determination flag and residual prediction flag is coded.

If the energy of base layer residual (or the number of non-zero pixels) is smaller than a threshold $Threshold_{residual}$, the coding of residual prediction flag is skipped.

If |BaseMV−CurrMV| is smaller than threshold $Threshold_{MV}$, a value of one minus residual prediction flag, i.e., 1−residual prediction flag, is coded; otherwise, a value of zero minus residual prediction flag, i.e., 0−residual prediction flag, which is the same as the residual prediction flag, is coded.

Figure 4:
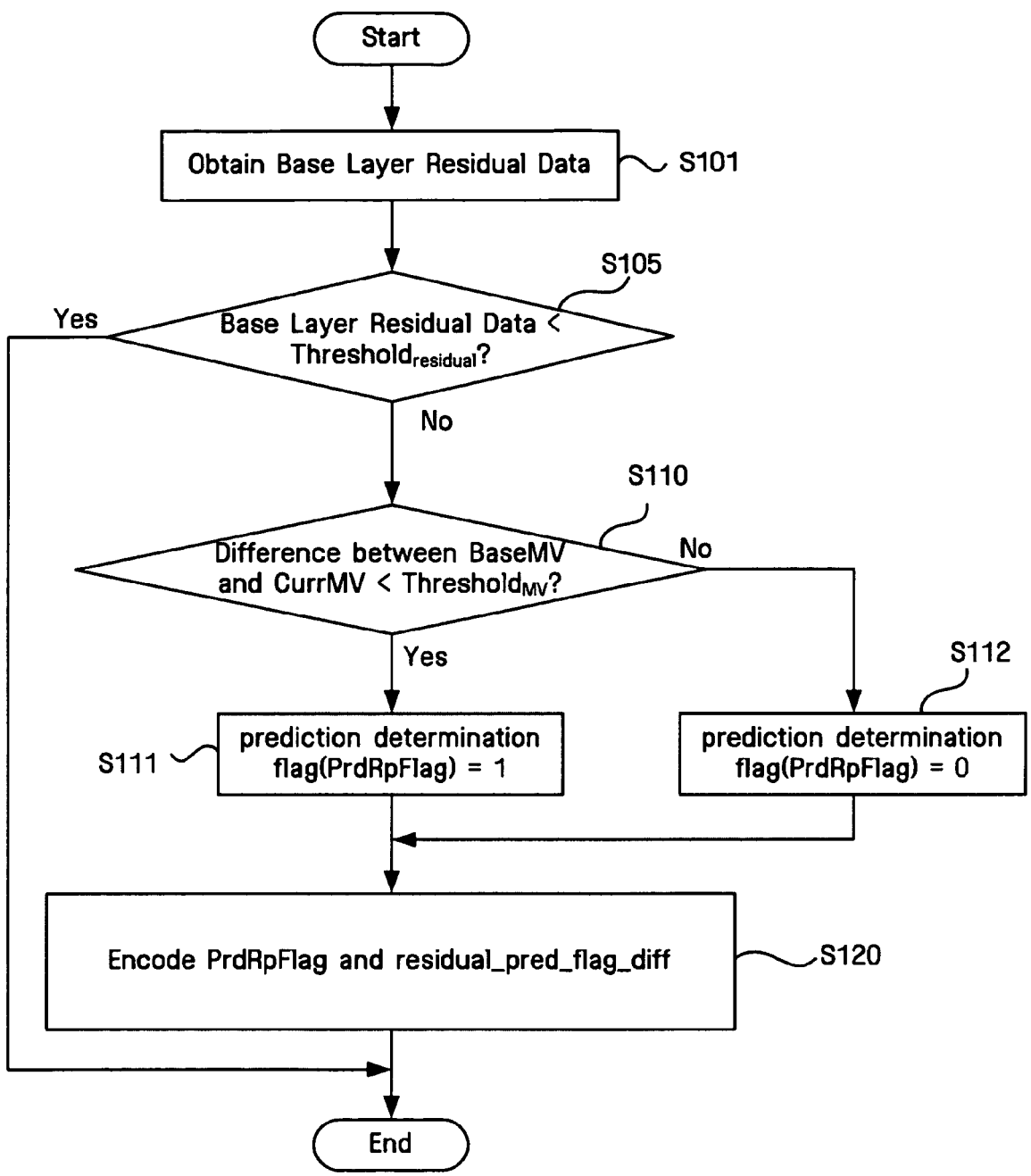
FIG. 4 is a flowchart illustrating a method of increasing the coding efficiency of a residual prediction flag according to an exemplary embodiment of the present invention.

FIG. 4 is a flowchart illustrating a process for implementing the above concept. Referring to FIG. 4, in step S101, base layer residual data is obtained by, for example, temporal inter coding by referring to another frame or block. If the base layer residual data is smaller than a predetermined threshold, i.e., $Threshold_{residual}$, in step S105, for example, if the base residual data has a value of 0 or the entire energy is smaller than the predetermined threshold, the coding of the residual prediction flag is skipped because it does not need to be set. Conversely, if the base layer residual data is greater than $Threshold_{residual}$ in step S105, the residual prediction flag selectively has a value of 1 or 0. A basis for selecting a prediction determination flag, labeled PrdRpFlag, may be set.

If a difference between a BaseMV and a CurrMV is smaller than a predetermined threshold, i.e., $Threshold_{MV}$, in step S110, which means that the probability of using the base layer residual data is high, the prediction determination flag is set to 1 in step S111. Conversely, if the difference between the BaseMV and the CurrMV is greater than $Threshold_{MV}$ in step S110, the probability of using the base layer residual data is low. Thus, the prediction determination flag is set to 0 in step S112. In step S120, the prediction determination flag set in step S111 or S112 and the residual predication difference flag corresponding to a difference between the residual prediction flag and the prediction determination flag are coded. The encoder can code the prediction determination flag and residual prediction difference flag on a macroblock-by-macroblock, slice-by-slice, or frame-by-frame basis.

Figure 5:
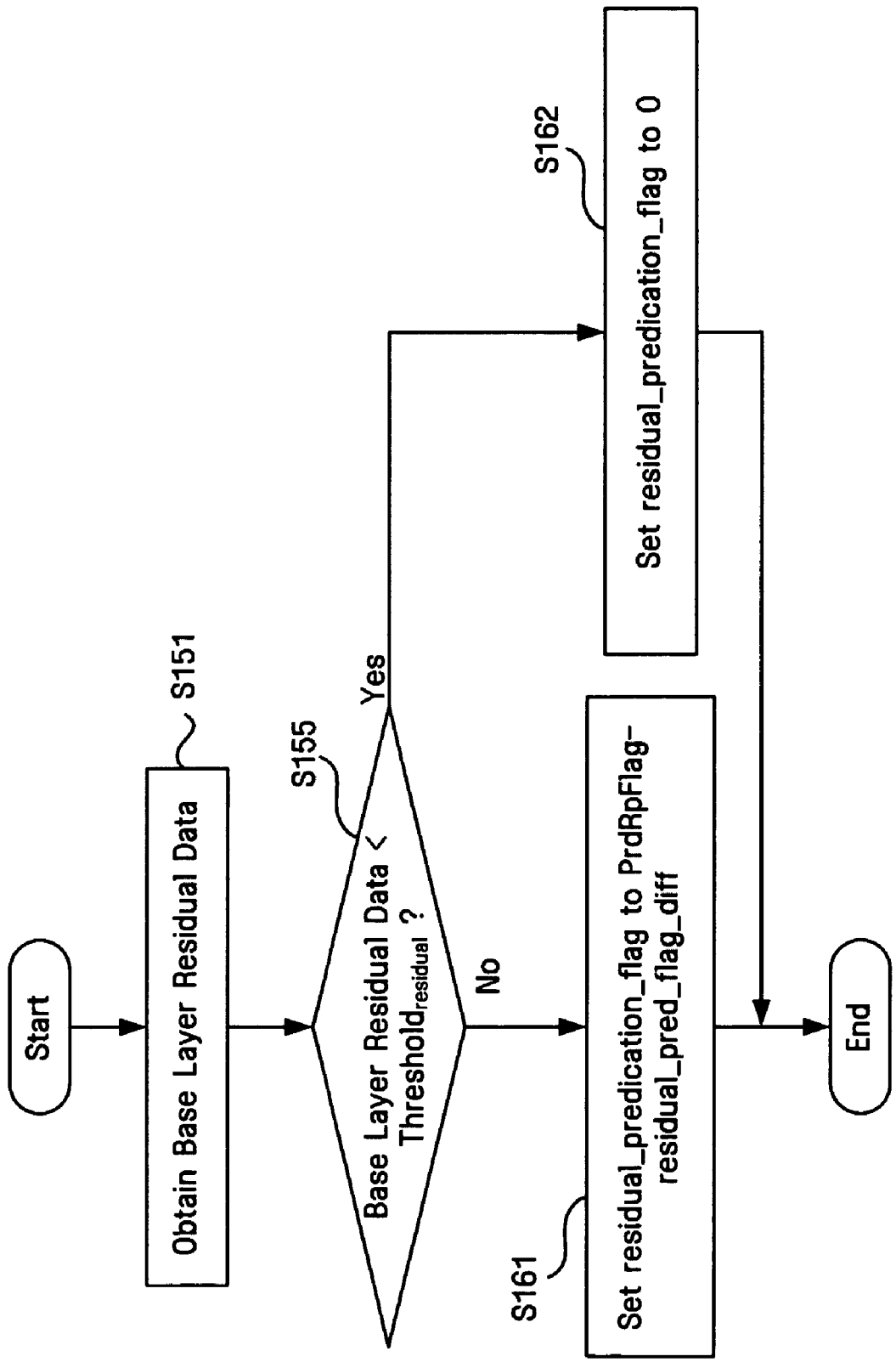
FIG. 5 is a flowchart illustrating a method of decoding data coded using the method illustrated in FIG. 4 according to an exemplary embodiment of the present invention.

FIG. 5 is a flowchart illustrating a process for decoding data encoded using the method illustrated in FIG. 4 according to an exemplary embodiment of the present invention.

First, in step S151, base layer residual data is obtained from coded data. On one hand, if the residual data is not smaller than a predetermined threshold, i.e., $Threshold_{residual}$, in step S155, (NO in step S155), the residual prediction flag is set to a difference between coded prediction determination flag and residual predication difference flag in step S161. As defined in the coding procedure illustrated in FIG. 4, a prediction determination flag and a residual prediction difference flag will be labeled PrdRpFlag and residual_pred_flag_diff, respectively. Then, residual_pred_flag_diff=PrdRpFlag−residual_predication_flag. Thus, the residual prediction_flag can be obtained by subtracting residual_pred_flag_diff from PrdRpFlag.

On the other hand, if the residual data is smaller than $Threshold_{residual}$ in step S155, (YES in step S155), which means that an enhancement layer is not generated by referring to the residual prediction flag, the residual prediction flag is set to 0 in step S162.

In the above description, coded is information other than the residual prediction flag indicating whether base layer residual data is referred to, thereby increasing coding efficiency. Similarly, other information may be coded instead of coding motion prediction flag which indicates whether or not base layer motion information is used for motion vector prediction to achieve the same purpose.

Figure 6:
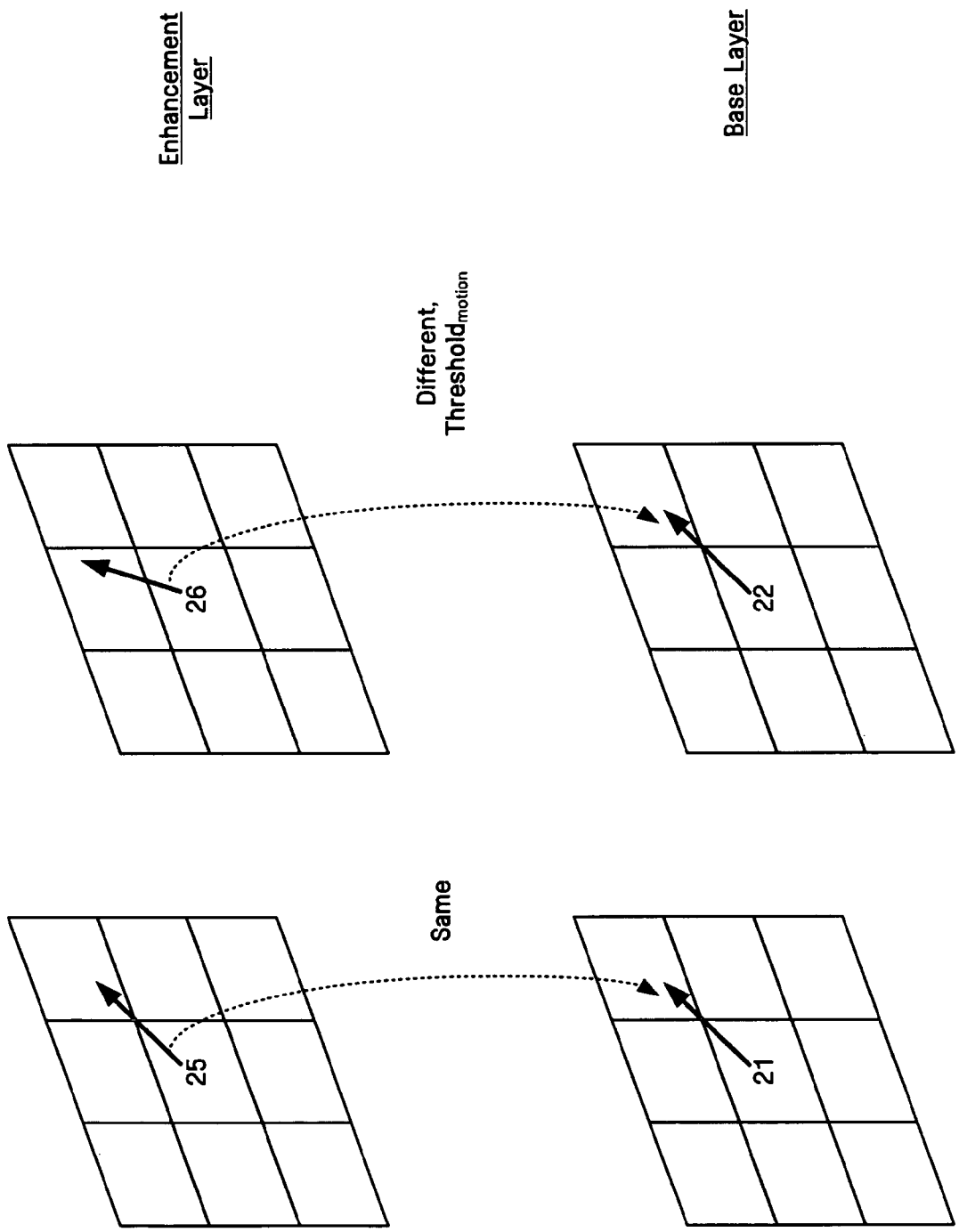
FIG. 6 is a diagram showing an example of motion prediction in video coding according to an exemplary embodiment of the present invention.

FIG. 6 is a diagram showing an example of motion prediction in video coding according to an exemplary embodiment of the present invention. Motion prediction refers to prediction of an enhancement layer or current layer motion vector from a base layer motion vector. Thus, if a motion prediction flag, labeled motion_prediction_flag, is set to 1, an enhancement layer motion vector is predicted by referring to a base layer motion vector. Otherwise, if the motion prediction flag is set to 0, the base layer motion vector is not referred to 21 or

25 in FIG. 6 denotes a macroblock (or sub-block), a slice, or a frame. For convenience of explanation, it is assumed that the motion prediction is performed on a macroblock-by-macroblock basis. A motion vector for a base layer macroblock 21 is the same as a motion vector for an enhancement layer macroblock 25. In this case, the coding of a motion prediction flag is not required. The coding of the motion prediction flag may also be skipped if a residual between the two motion vectors is smaller than a predetermined threshold, i.e., $Threshold_{Motion}$.

Meanwhile, the motion prediction flag can be determined by comparing a base layer motion vector with motion vectors from spatially adjacent regions. The spatially adjacent regions can give accurate motion vectors; however, in some cases, motion prediction may not be performed accurately. This may result in a large motion vector residual. Although the accuracy of motion prediction from base layer motion vector is lower than the spatial motion prediction, the former provides a reasonable accuracy in almost all cases. Thus, the residual between two motion vectors can be used to predict the motion prediction flag.

If the residual between motion vectors from macroblocks 22 and 26 is greater than a predetermined threshold, i.e., $Threshold_{MV}$, a prediction determination flag, labeled prediction_determination_flag, is set to 1 because it is highly likely that the motion prediction flag is set to 1. On the other hand, if the residual between the motion vectors from macroblocks 22 and 26 is smaller than $Threshold_{MV}$, the prediction determination flag is set to 0 because it is highly likely that the motion prediction flag is set to 0.

Once the value of the prediction determination flag has been set, a motion prediction difference flag, labeled motion_pred_flag_diff, corresponding to a difference between the prediction determination flag and the motion prediction flag, is coded.

Figure 7:
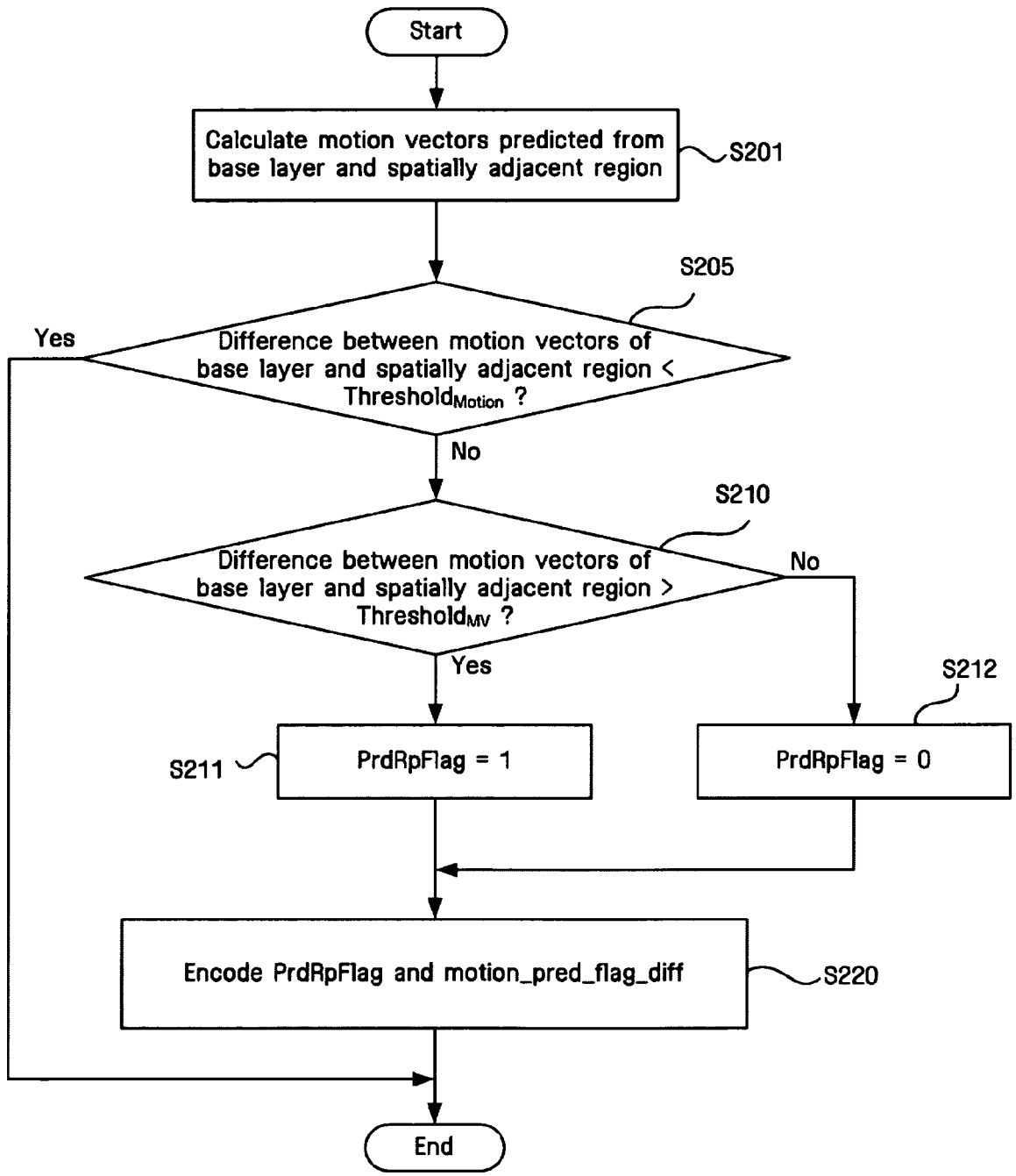
FIG. 7 is a flowchart illustrating an exemplary method of increasing the coding efficiency of a motion prediction flag.

FIG. 7 is a flowchart illustrating a method of increasing the coding efficiency of motion prediction flag.

Referring to FIG. 7, a motion vector predicted from a base layer, labeled Predict_MV_From_BaseLayer, and a motion vector predicted from a spatially adjacent region, labeled Predict_MV_From_Spatia, are obtained in step S201. In step S205, on one hand, if a difference between the two motion vectors is smaller than a predetermined threshold, i.e., $Threshold_{Motion}$, the motion prediction flag is not coded. On the other hand, if the difference between the two motion vectors is greater than $Threshold_{MV}$, a prediction determination flag is set to predict the motion prediction flag instead of the motion prediction flag. The prediction determination flag is set to 1 or 0 depending on whether the difference is greater than $Threshold_{MV}$ or not in step 210.

That is, if the difference is greater than $Threshold_{MV}$ in step S210, the prediction determination flag is set to 1 in step S211. If the difference is smaller than $Threshold_{MV}$, the prediction determination flag is set to 0 in step S212. In step S220, the value of the prediction determination flag set in step 211 or 212, either 1 or 0, and the residual predication difference flag corresponding to a difference between the residual prediction flag and the prediction determination flag are coded.

Figure 8:
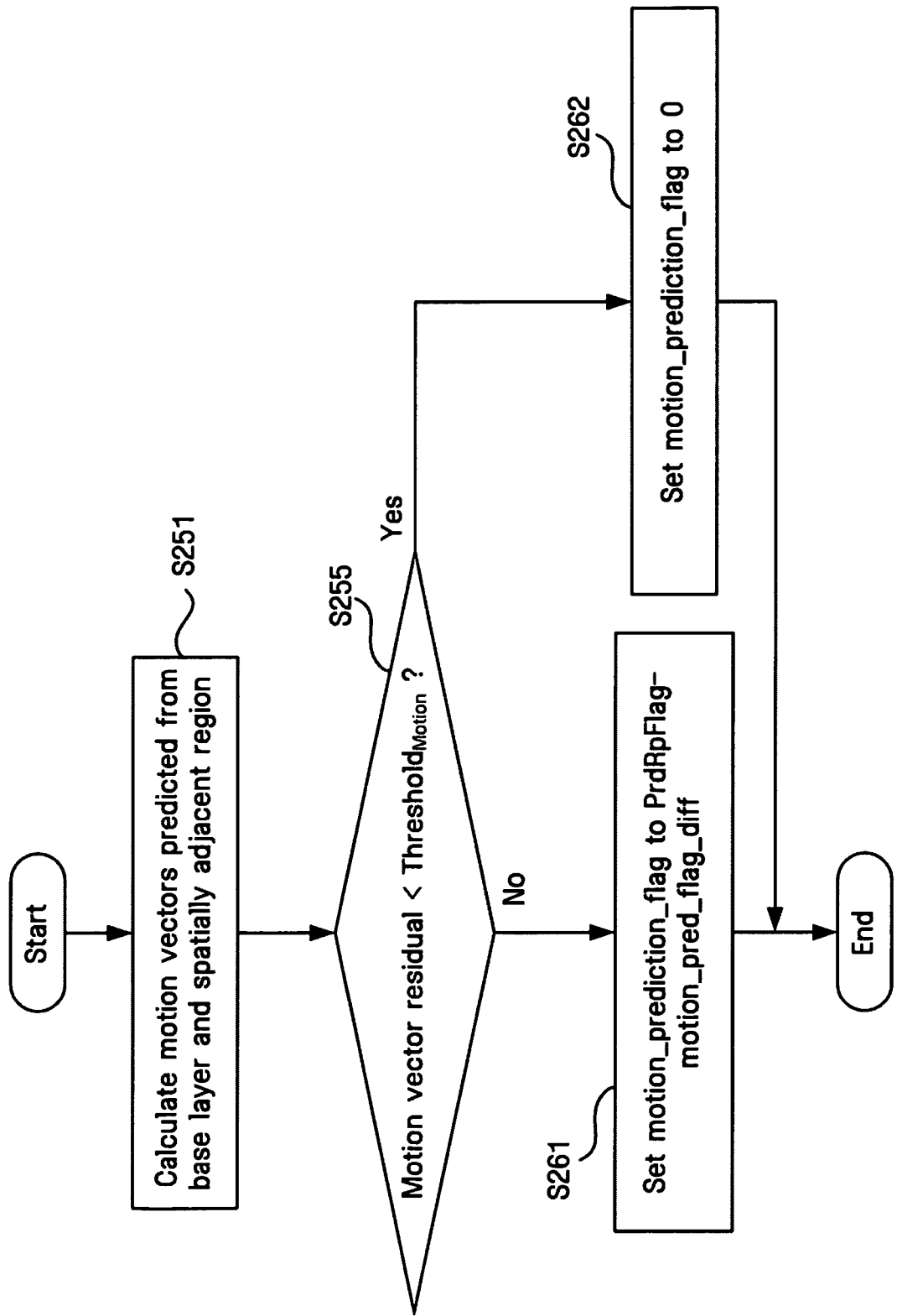
FIG. 8 is a flowchart illustrating a method of decoding data coded using the method illustrated in FIG. 7 according to an exemplary embodiment of the present invention.

FIG. 8 is a flowchart illustrating a method of decoding data coded using the method illustrated in FIG. 7 according to an exemplary embodiment of the present invention.

Referring to FIG. 8, in step S251, a motion vector predicted from a base layer and a motion vector predicted from a spatially adjacent region are obtained based on the encoded data.

In step S255, on one hand, if a difference between the two motion vectors is not smaller than a predetermined threshold, i.e., $Threshold_{Motion}$, a value of a motion prediction flag, labeled motion_prediction_flag, is set to a difference between a prediction determination flag and a motion prediction difference flag in step S261. As defined in the coding procedure illustrated above, the prediction determination flag and the residual prediction difference flag are labeled PrdRpFlag and residual_pred_flag_diff, respectively. Then, motion_pred_flag_diff=PrdRpFlag-motion_prediction_flag. Thus, the motion_prediction_flag can be obtained by subtracting motion_pred_flag_diff from PrdRpFlag.

On the other hand, in step S255, if the difference is smaller than the $Threshold_{Motion}$, the motion_prediction_flag is set to 0 in step S262.

As described above with reference to FIGS. 3 through 8, data to be coded is predicted from base layer data to reduce the size of the data to be coded. A method for reducing the size of data to be coded according to another exemplary embodiment of the present invention will now be described.

In the coding process illustrated in FIGS. 3 through 8, the coding of a flag indicating whether base layer data is referred to is skipped when base layer data is not required for prediction or a value for predicting the flag is coded instead of the flag itself.

In another exemplary embodiment, the coding of residual predication flag is skipped using base layer data, or the residual predication flag may be converted to a new value for coding.

When base layer residual has no non-zero pixels or when a CBP of a base layer is zero, the coding of residual predication flag can be skipped because the residual predication flag can be predicted. Otherwise, a value of one minus the residual predication flag, i.e., 1−residual predication flag, is coded because it is highly likely that the residual predication flag has a value of 1. In this case, because the size of data to be coded may increase when 1 is coded, 0 may be coded instead of 1 in order to increase coding efficiency.

The above approach is useful when a Variable Length Coding (VLC)-based coder is used because the approach generates more zeros. When context-based adaptive binary arithmetic coding (CABAC) is used, it is possible to efficiently compress bits or a bit pattern frequently appearing in data to be coded. Thus, the overall compression ratio can be increased by adjusting a data pattern containing 1's or 0's. CABAC achieves high compression performance by selecting a probability model for each symbol based on a symbol context, adapting probability estimates corresponding to the probability model based on local statistics and performing arithmetic coding on the symbol. The coding process of the data symbol consists of at most four elementary steps: 1. Binarization; 2. Context modeling; 3. Arithmetic coding; and 4. Probability updating.

1. Binarization

Among CABAC techniques, binary arithmetic coding allows a given non-binary valued symbol to be uniquely mapped to a binary sequence. In CABAC, only a binary decision enters a coding process. Non-binary valued symbols, such as transform coefficients or motion vectors, are converted into binary codes prior to the actual arithmetic coding process. This process is similar to converting data symbols to parameter length codes except that the binary codes are previously coded by an arithmetic encoder prior to transmission.

The following elementary operations of context modeling, arithmetic coding, and probability updating are recursively performed on the respective bits of the binarized codes, i.e., bins.

2. Context Modeling

A context model, which is a probability model for one or more bins of binarized symbols and chosen based on the recently coded data symbol statistics, stores a probability for each bin to be "1" or "0."

3. Arithmetic Coding

An arithmetic encoder codes each bin based on the chosen probability model. Each bin has only two probability sub-ranges corresponding to values of "1" and "0," respectively.

4. Probability Updating.

The chosen probability model is updated based on actually coded values. That is to say, if the bin value is 1, the number of occurrences of 1's is incremented by one.

Because a context model is selected for each slice according to the above-described CABAC, probability values of probability models are initialized to a table of constant values for the slice. CABAC provides better coding efficiency than conventional VLC when a predetermined amount of information is accumulated because a context model has to be continuously updated based on statistics of recently-coded data symbols.

Figure 9:
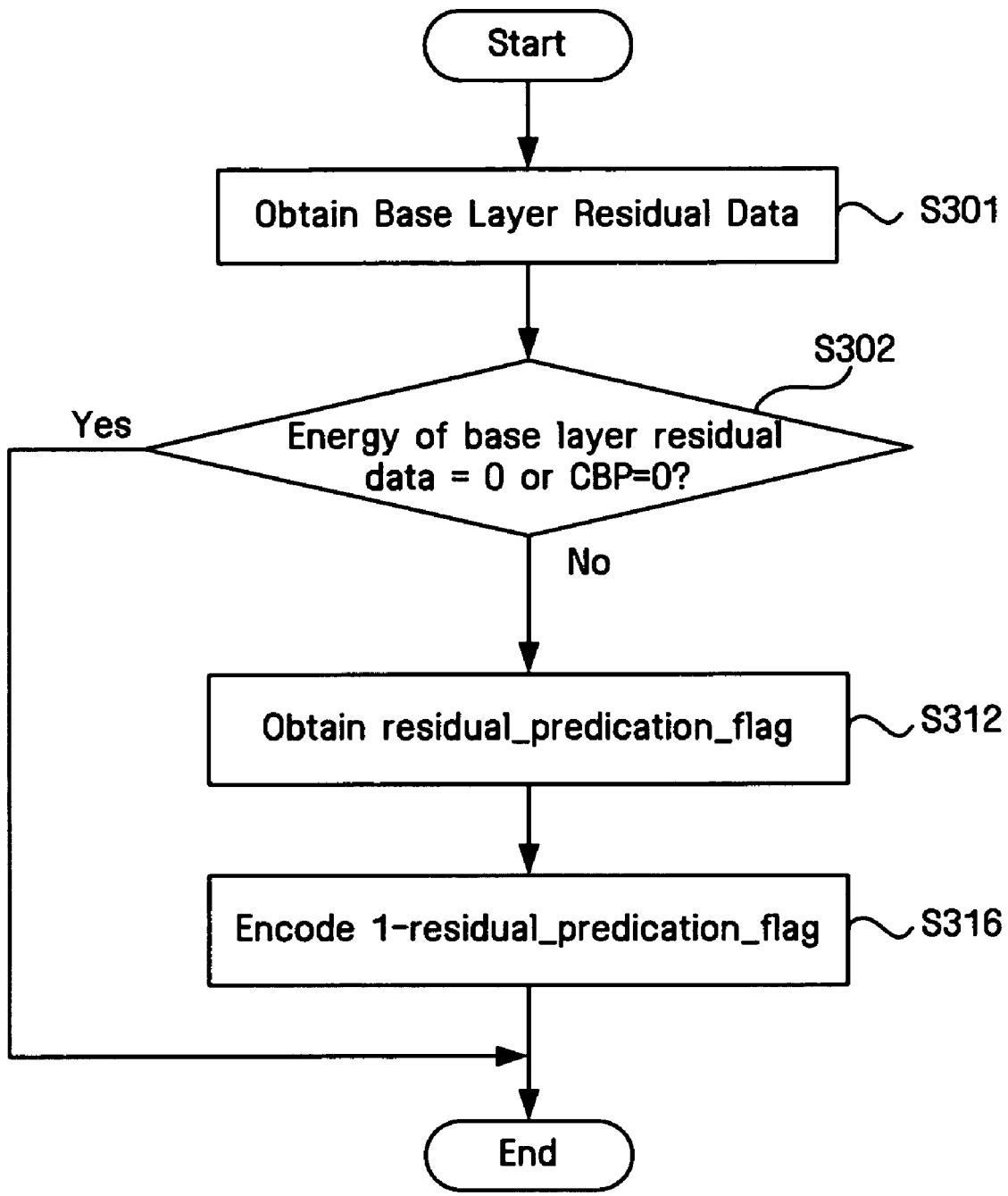
FIG. 9 is a flowchart illustrating a process for coding reversed residual prediction data according to an exemplary embodiment of the present invention.

FIG. 9 is a flowchart illustrating the above process wherein the coding of a residual predication flag, labeled residual_predication_flag, is skipped using the energy of base layer residual or a CBP value, or the residual predication flag is converted to a new value for coding.

In step S301, the base layer residual data is obtained. If the energy of the base layer residual data or the CBP value is 0 in step S302, which means that the base layer residual data has no non-zero pixels, the base layer residual data is not referred to in an enhancement layer. Thus, the coding of the residual predication flag is not required.

Conversely, if the energy of the base layer residual data or a CBP value is not 0, which means that the base layer residual data has non-zero pixels, the residual predication flag is meaningful, so the value of the residual predication flag is obtained in step S312. Then, in step S316, a reversed residual predication flag that is defined as a value of one minus the residual predication flag, i.e., 1−residual_predication_flag, is coded.

Figure 10:
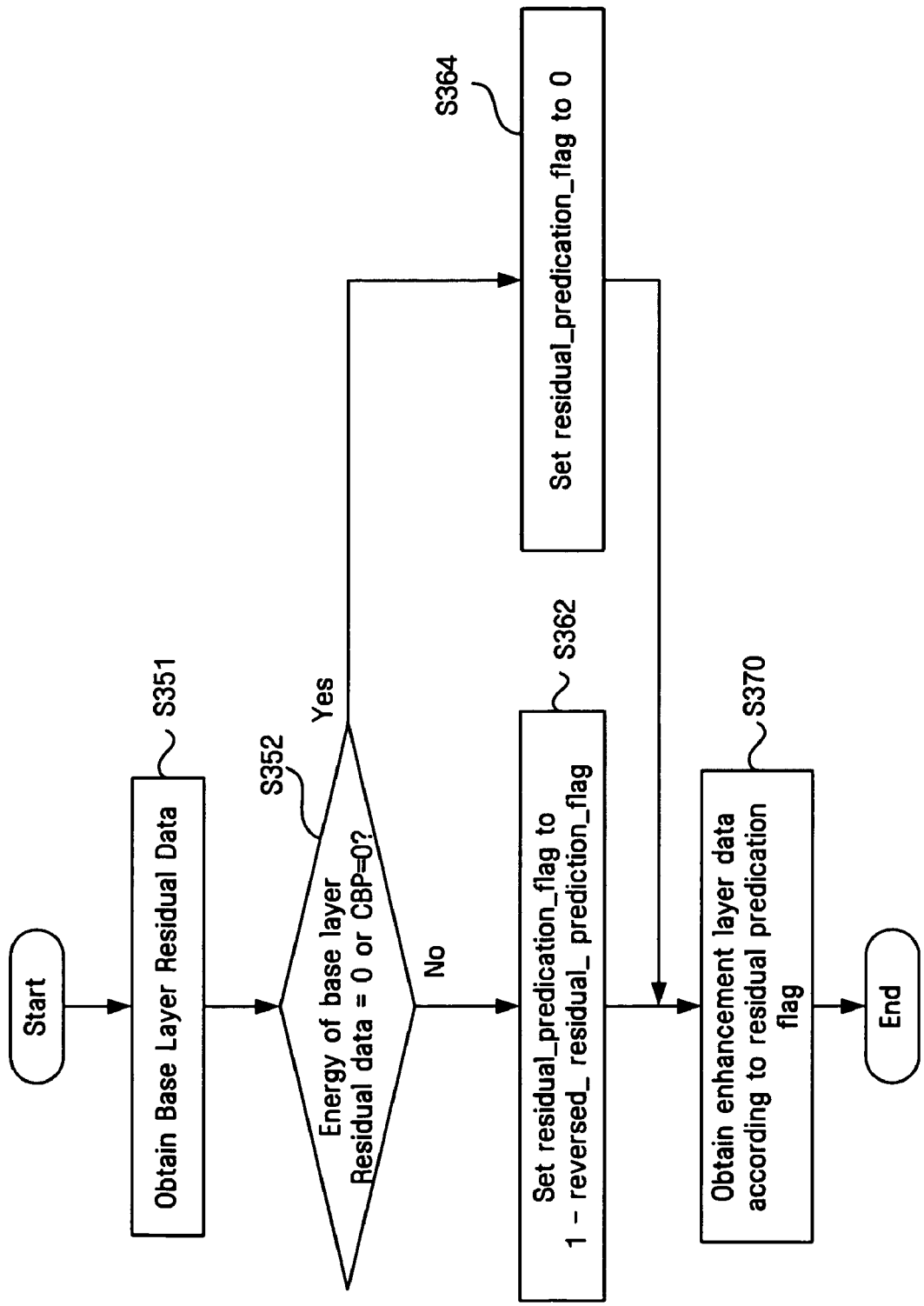
FIG. 10 is a flowchart illustrating an exemplary process for decoding data coded using the process illustrated in FIG. 9.

FIG. 10 is a flowchart illustrating a process for decoding data coded using the process illustrated in FIG. 9. Referring to FIG. 10, in step S351, base layer residual data is obtained. If the energy of the base layer residual data or the CBP value is 0 in step S352, which means that there is no data to be used for prediction in an enhancement layer, the residual predication flag is set to 0 in step S364. Conversely, if the base layer residual data has non-zero pixels, the residual predication flag is meaningful. Since the data coded according to the method illustrated in FIG. 9 is a value of one minus the residual predication flag, i.e., 1−residual_predication_flag, that is, a reversed residual predication flag, the residual predication flag can be set to a value of one minus the reversed residual predication flag, i.e., 1−reversed residual predication flag, in step S362. Then, in step 370, enhancement layer data is obtained according to the value of the residual predication flag.

In the illustrated embodiment shown in FIGS. 9 and 10, the coding process has been described that it can be determined whether to encode the residual predication flag using the base layer residual data and coding is performed using a reversed value of the base layer residual data, thereby improving coding efficiency.

Next, a method of coding the residual prediction flag using a modified context when CABAC is used will be described. Because CABAC is used to encode symbols based on a context as described above, it offers variable compression ratios depending on the context model biased to either 0 or 1. For example, when a context is biased to 0, the compression ratio is high when data containing more 0's than 1's is compressed using the context. On the other hand, if a context is biased to 1, the compression ratio is high if data containing more 1's than 0's is compressed using the context. As described above with reference to FIG. 9, it is highly likely that the residual prediction flag is 1 if it is coded. Thus, the residual prediction flag is coded according to a modified context biased to symbol.

Figure 11:
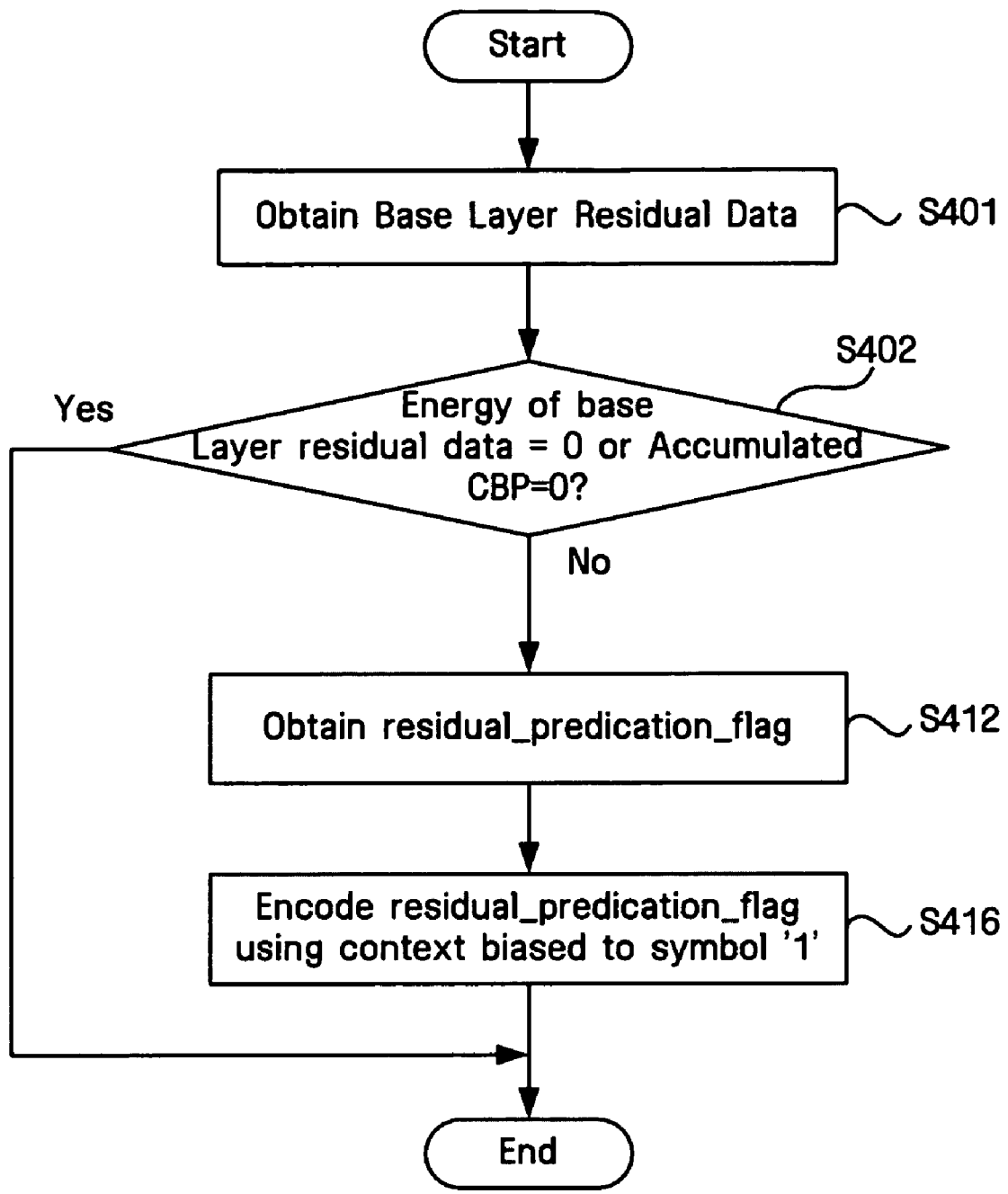
FIG. 11 is a flowchart illustrating a process for coding a residual prediction flag using a modified context according to an exemplary embodiment of the present invention.

FIG. 11 is a flowchart illustrating a process for coding a residual prediction flag, labeled residual_prediction_flag, using a modified context according to an exemplary embodiment of the present invention. As described above, according to the coding process, the coding of the residual prediction flag is skipped using the energy of base layer residual or a CBP value, or the residual prediction flag is coded using a context biased to symbol '1'.

Referring to FIG. 11, base layer residual data is obtained in step S401. If the energy of the base layer residual data or the CBP value is 0 in step S402, which means that the base layer residual data has no non-zero pixels, the base layer residual data is not referred to in an enhancement layer. Thus, the coding of the residual prediction flag is not required. Meanwhile, if a multi-layer structure is used, the CBP value can be accumulated from the lowest layer. In this case, if the CBP value accumulated from a base layer is 0, the coding of the residual prediction flag is also skipped.

If the energy of base layer residual data or accumulated CBP is not 0, which means that the base layer residual data has non-zero pixels, the residual prediction flag is meaningful so the value of the residual prediction flag is obtained in step S412. Because it is highly likely that the residual prediction flag is 1, the residual prediction flag is coded using a context biased to symbol '1' in step S416.

Figure 12:
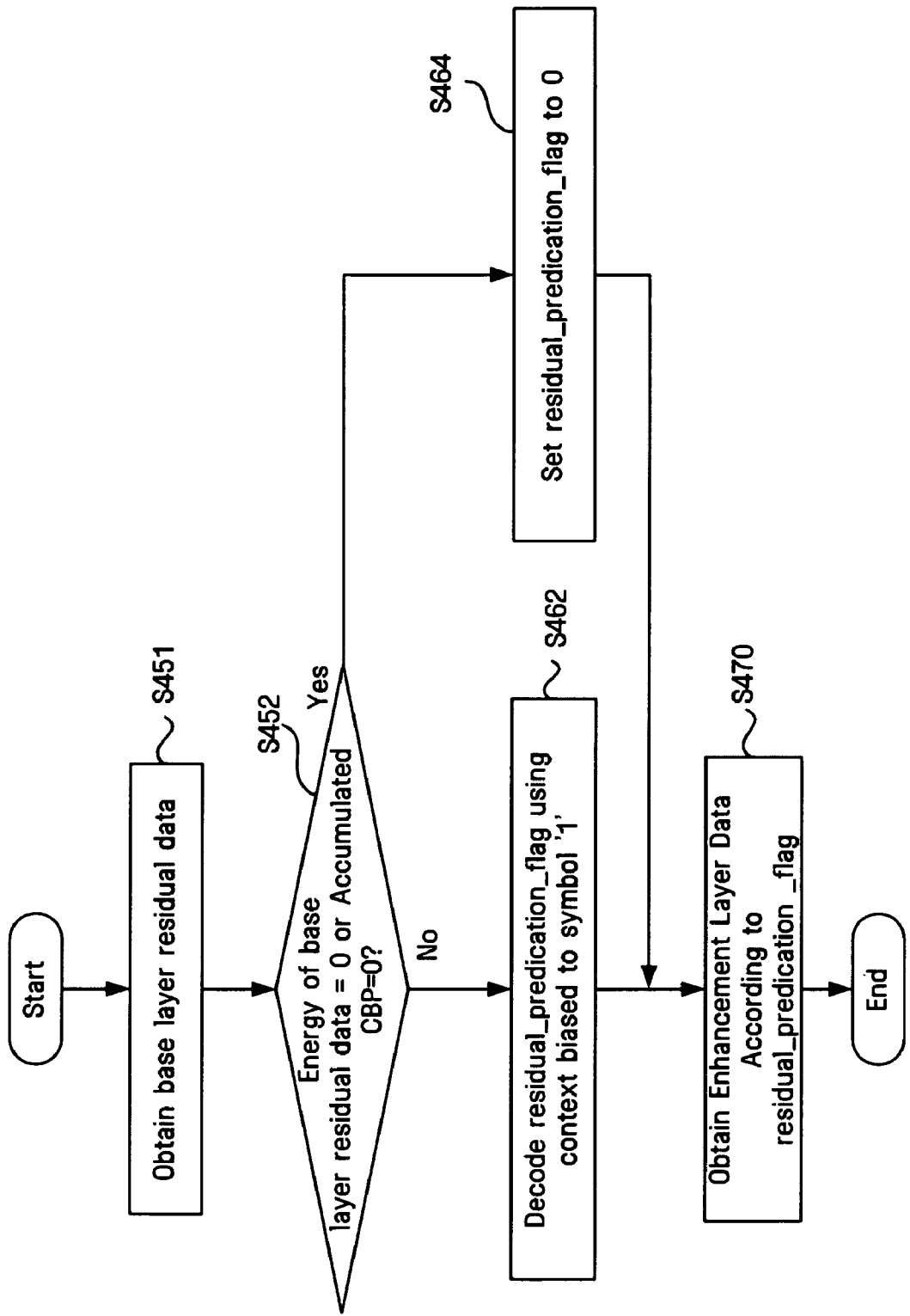
FIG. 12 is a flowchart illustrating an exemplary process for decoding data coded using the process illustrated in FIG. 11.

FIG. 12 is a flowchart illustrating a process for decoding data coded using the process illustrated in FIG. 11. Referring to FIG. 12, in step S451, base layer residual data is obtained. If the energy of base layer residual data or accumulated CBP is 0 in step S452, which means that there is no data to be used for prediction in an enhancement layer, the residual predication flag is set to 0 in step S464. Conversely, if the base layer residual data has non-zero pixels in step S452, the residual predication flag is meaningful. Thus, the residual predication flag is decoded using a context biased to symbol '1' in step S462. Then, in step 470, enhancement layer data is obtained according to the value of the residual predication flag.

Alternatively, it may be determined whether to encode the residual prediction flag using the energy of base layer residual data or a CBP value. If the energy of base layer residual data or the CBP value falls within a predetermined range, the coding of the residual prediction flag may be skipped. The pseudo code for coding is given as follows:

---

If (energy of base layer residual data is 0 or CBP value is 0)
   then
      skip coding of residual_predication_flag
   else
      encode residual_predication_flag

---

If the energy of the base layer residual or the CBP value is 0 as a result of decoding, a decoder performs a decoding process without residual prediction on a base layer. Otherwise, the value of the residual prediction flag is decoded. The pseudo code for decoding is given as follows:

```
If (energy of base layer residual data is 0 or CBP value is 0)
    then
        skip decoding of residual_prediction_flag
    else
        decode residual_prediction_flag
```

Figure 13:
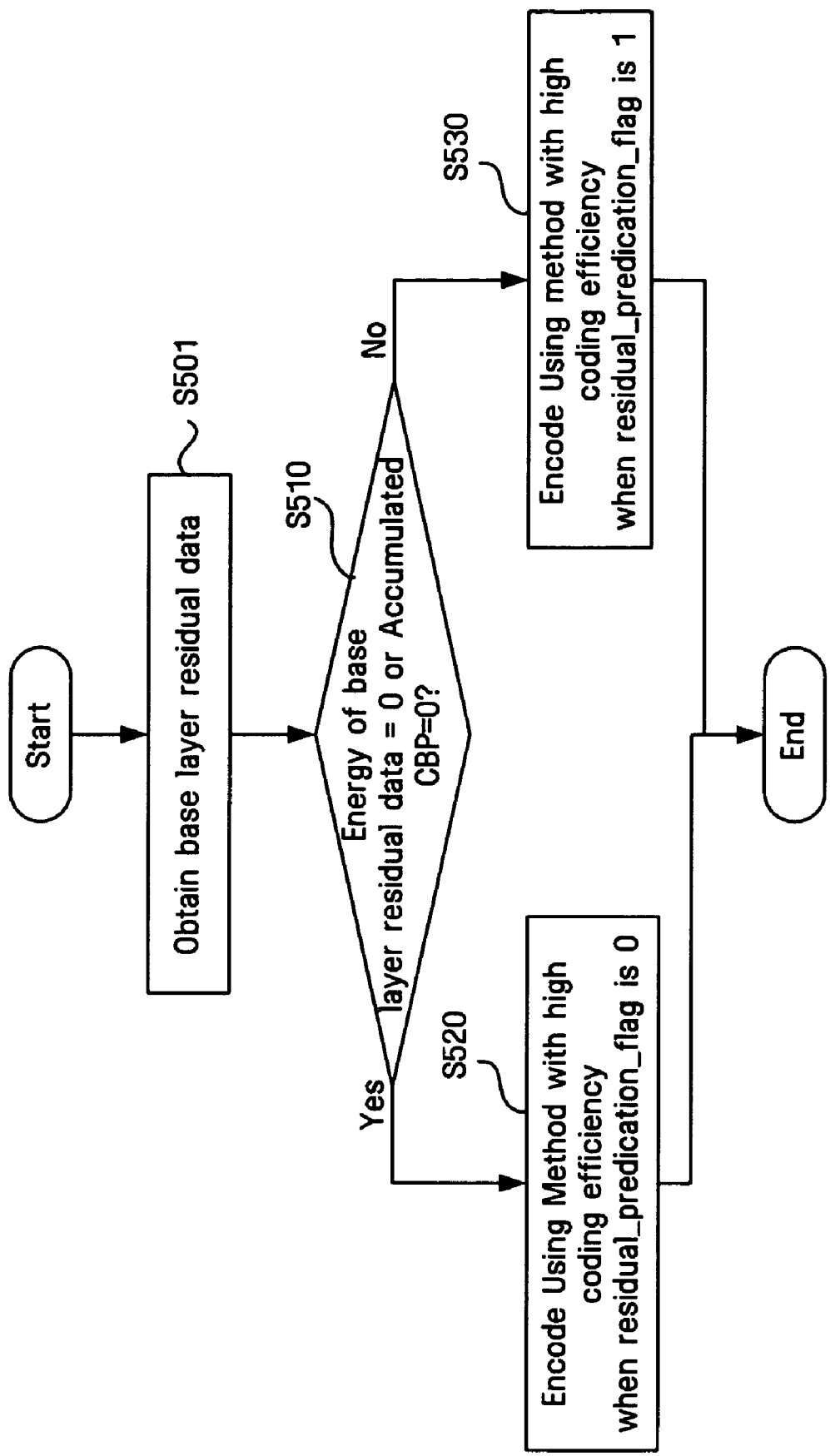
FIG. 13 is a flowchart illustrating an example in which a coding mode varies depending on base layer residual data.

FIG. 13 is a flowchart illustrating an example in which a coding mode varies according to base layer residual data.

Referring to FIG. 13, in step S501, base layer residual data is obtained. In step 520, if the energy of base layer residual data or the CBP value is 0, which means that the residual prediction flag is 0, a coding method that offers high coding efficiency when the residual prediction flag is 0 is used. For example, if CABAC is used for coding, the residual prediction flag may be coded using a probability model for a CABAC context model having a higher probability of being '0' than being '1'.

Conversely, if the energy of base layer residual data or the CBP value is not 0, it is highly likely that the residual prediction flag is 1. Thus, a coding method that offers high coding efficiency when the residual prediction flag is 1 is used in step S530. For example, if CABAC is used as a coding method, the residual prediction flag may be coded using a probability model for a CABAC context model having a higher probability of being '1' than being '0'.

The pseudo code for the process illustrated in FIG. 13 is given as follows:

```
If (energy of base layer residual data is 0 or CBP value is 0)
    then
        encode using a method offering high coding efficiency
            when residual predication flag is '0'
    else
        encode using a method offering high coding efficiency
            when residual predication flag is '1'
```

In multi-layered video coding where video data is coded into a base layer, a fine granularity scalability (FGS) layer and an enhancement layer, energy of residual data or a CBP value may be referred to in the base layer or FGS layer.

A decoding process is performed in a similar manner to the coding process. That is, after base layer residual data is obtained, if the energy of residual data or the CBP value is 0, which means that the residual prediction flag is 0, coded video data is decoded using a method offering high coding efficiency when the residual prediction flag is 0 is used. For example, if CABAC is used for coding, video data may be decoded using a CABAC context model having a higher probability of being '0' than being '1' in order to obtain the residual prediction flag.

Conversely, if the energy of base layer residual data or a value of a CBP value is not 0, which means that it is highly likely that the residual prediction flag is 1, a video signal coded according to a coding method that offers high coding efficiency when the residual prediction flag is 1 is decoded in a manner similar to the coding method. For example, if CABAC is used as the coding method, video data may be decoded using a probability model for a CABAC context model having a higher probability of being '1' than being '0' in order to obtain the residual prediction flag. The pseudo code for the decoding process is given as follows:

```
If (energy of base layer residual data is 0 or CBP value is 0)
    then
        decode according to a method offering high coding
            efficiency when the residual predication flag is '0'
    else
        decode according to a method offering high coding
            efficiency when the value of the residual predication flag
            is '1'
```

Referring to FIG. 13, in steps 520 and 530, the coding methods offering high coding efficiency when the residual prediction flag is 0 and when the residual prediction flag is 1, respectively, are used. One of the methods offering high coding efficiency is to use different context models during entropy coding.

Figure 14:
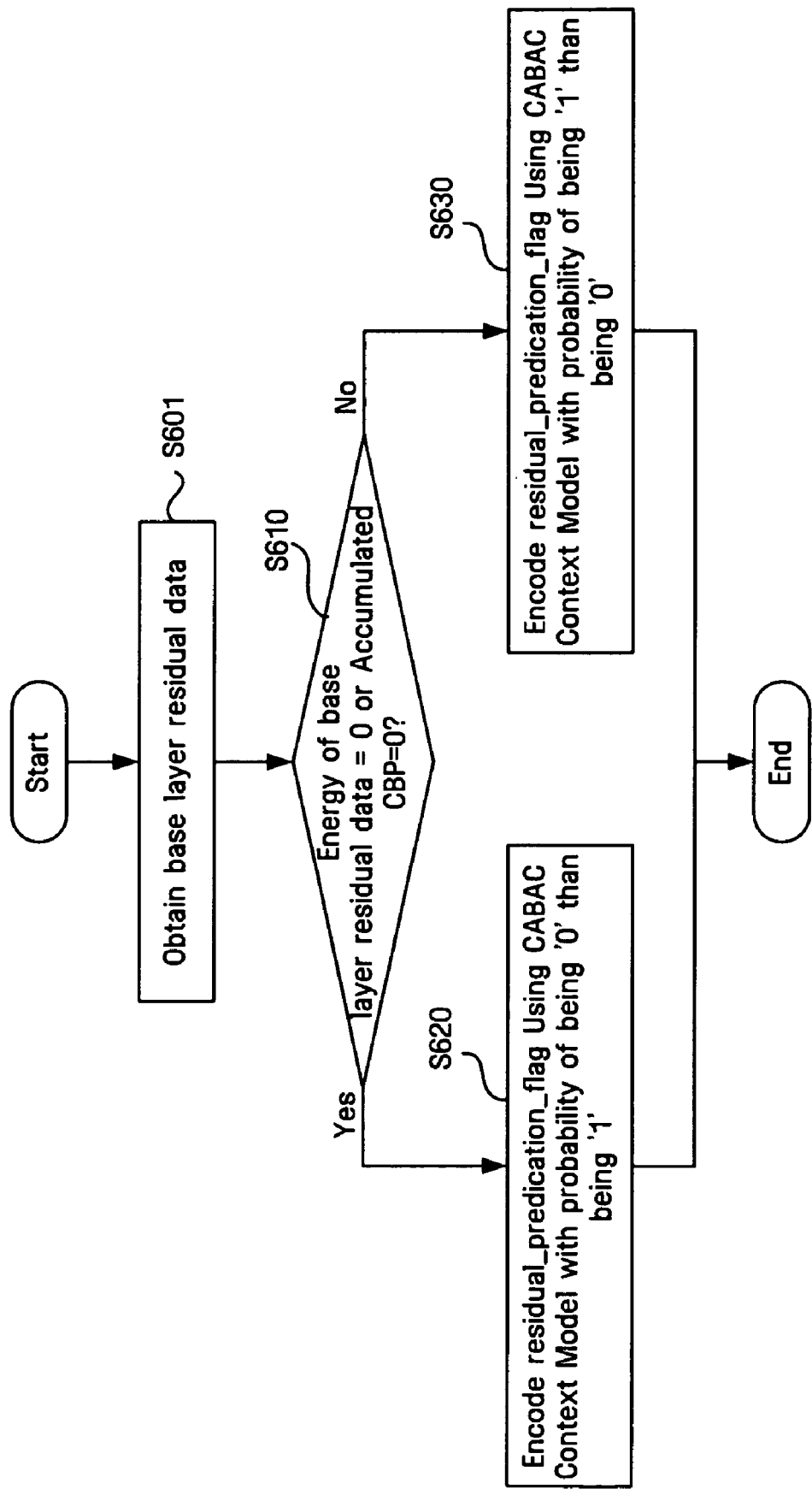
FIG. 14 is a flowchart illustrating a coding process using different context models when context-based adaptive binary arithmetic coding (CABAC) is performed according to an exemplary embodiment of the present invention.

FIG. 14 is a flowchart illustrating a coding process using different context models when CABAC is used according to an exemplary embodiment of the present invention. Referring to FIG. 14, in step S601, base layer residual data is obtained. If the energy of the base layer residual or the CBP value is 0 in step S610, which means that the residual prediction flag is 0, the residual prediction flag is coded using a CABAC context model having a higher probability of being '0' than being '1' in step S620. Conversely, if the energy of base layer residual data or the value CBP value is not 0 in step S610, it is highly likely that the residual prediction flag is 1. Thus, the residual prediction flag is coded using a CABAC context model having a higher probability of being '1' than being '0' in step S630.

Figure 15:
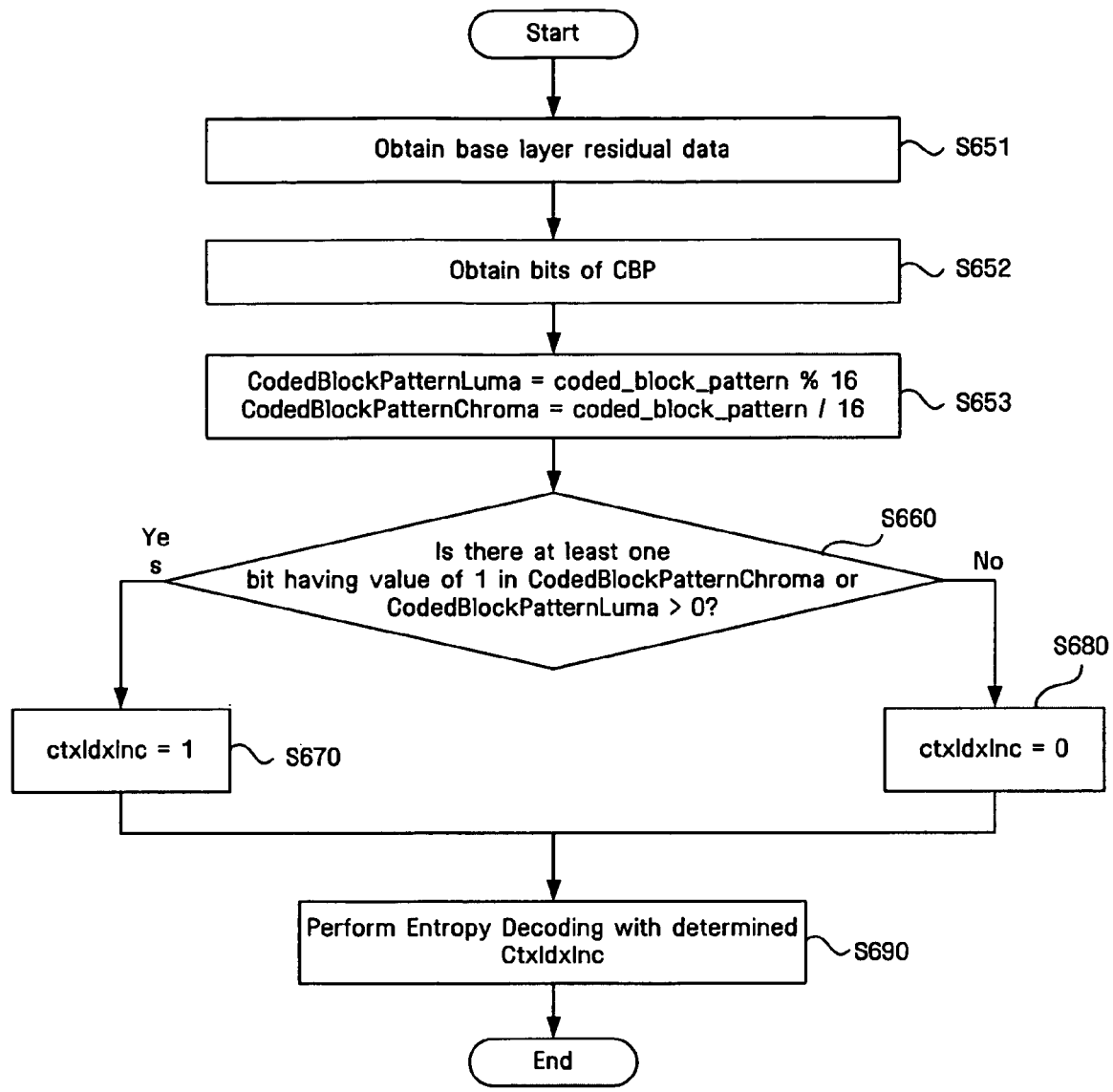
FIG. 15 is a flowchart illustrating an exemplary process for decoding video data coded using the process illustrated in FIG. 14.

FIG. 15 is a flowchart illustrating a process for decoding video data coded using the process illustrated in FIG. 14. In step S651, base layer residual data is obtained. In step S652, bits of a coded block pattern (CBP) are obtained. In step S653, 4 less significant bits in the CBP are allocated to a CBP value for luminance, labeled CodedBlockPatternLuma, and 2 more significant bits are allocated to a CBP value for chrominance, labeled CodedBlockPatternChroma, respectively. CBP values for 4 sub-blocks in a macroblock can be known from the CBP value of the CodedBlockPatternLuma. CBP values for DC and AC components can be known from the CBP value of the CodedBlockPatternChroma. Formats of a coded_block_pattern, CodedBlockPatternLuma, and CodedBlockPatternChroma are shown in the following Table 1. The coded_block_pattern offers information on whether a sub-block or a macroblock represented by each bit has non-zero pixels.

TABLE 1

| coded_block_pattern | bit[5] | bit[4] | bit[3] | bit[2] | bit[1] | bit[0] |
|---|---|---|---|---|---|---|
| | CodedBlockPatternChroma | | CodedBlockPatternLuma | | | |

Bit[0] has a value of 1 when a top-left 8×8 lumablock of four 8×8 lumablocks in a macroblock has non-zero pixels. Bit[1] and bit[2] have a value of 1 when lower-left and lower-right 8×8 lumablocks have non-zero pixels.

Bit[4] and bit[5] have a value of 1 when DC and AC components of chromatic information in a macroblock have non-zero pixels.

Thus, the presence or absence of non-zero pixels can be determined by the value of a CBP. When at least one of four bits constituting CodedBlockPatternLuma has a value of 1 or the value of CodedBlockPatternChroma is greater than 0 in step S660, which means that residual data has non-zero pixels, it is highly likely that the residual prediction flag is 1. Thus, a value for selecting a context model for entropy decoding, labeled ctxIdxInc, is set to 1 in step S670. Once the value of ctxIdxInc has been set to 1, coded data is decoded using a coding method that offers high coding efficiency when the residual prediction flag is '1.' For example, the coded data may be decoded using a CABAC context model having a higher probability of being '1' than being '0.'

On the other hand, if none of four bits constituting CodedBlockPatternLuma has a value of 1 and the value of CodedBlockPatternChroma is 0 in step S660, which means that residual data has no non-zero pixels, it is highly likely that the residual prediction flag is 0. Thus, the value of ctxIdxInc is set to 0 in step S680 for selecting a context model for entropy decoding. Once the value of ctxIdxInc has been set to 0, coded data is decoded using a method that offers high coding efficiency when the residual prediction flag is '0.' For example, the coded data may be decoded using a CABAC context model offering a higher probability of being '1' than being '0.'

Once the value of ctxIdxInc has been selectively set to 1 in step S670 or to 0 in S680, in step S690, entropy decoding is performed using the set value of ctxIdxInc.

In step S660, it is determined whether a bit having a value of '1' is present in the CBP. As described above, the value of the CBP is allocated to CodedBlockPatternLuma and CodedBlockPatternChroma. The process of finding non-zero pixels using CodedBlockPatternLuma is as follows:

```
for (luma8×8BlkIdx = 0; i <= 3; i++){
    if ( (CodedBlockPatternLuma >> luma8×8BlkIdx) & 1) and
        (current macroblock is inter-macroblock) )
    then
        residualAvailLuma8×8Blk = 1;
        break;
    else
        residualAvailLuma8×8Blk = 0;
}
```

An AND bit operation (&) is performed for each luma8×8Blkldx to determine whether each bit of CodedBlockPatternLuma has a value of 1 and a check is made as to whether a current macroblock is an inter macroblock. If the current macroblock is an inter macroblock, residualAvailLuma8×8Blk is set to 1; otherwise, it is set to 0. The residualAvailLuma8×8Blk is used to set baseResidualAvailLuma8×8Blk and determine the value of ctxIdxInc that will determine a context model for entropy decoding.

The process of finding non-zero pixels using CodedBlockPatternChroma is as follows:

```
if ( (CodedBlockPatternChroma != 0) and
    (current macroblock is inter-macroblock) )
then
    residualAvailChroma = 1;
    break;
else
    residualAvailChroma = 0;
```

If the value of CodedBlockPatternChroma is not 0 and the current macroblock is an inter macroblock, residualAvailChroma is set to 1; otherwise, it is set to 0. The residualAvailLuma8×8Blk is used to set baseResidualAvailLuma8×8Blk and determine the value of ctxIdxInc that will determine a context model for entropy decoding.

Thus, if at least one of bits in CodedBlockPatternLuma or CodedBlockPatternChroma has a value of 1, it is determined that residual data has at least one non-zero pixel so that ctxIdxInc is set to 1. Otherwise, the ctxIdxInc is set to 0 for entropy decoding.

In the exemplary embodiments of the present invention described below, a "unit", "part" or a "module" indicates a software component or a hardware component such as a field-programmable gate array (FPGA) or an application-specific integrated circuit (ASIC). The unit performs a particular function but is not restricted to software and hardware. The unit may be included in an addressable storage medium or may be configured to play one or more processors. Accordingly, units may include components such as software components, object-oriented software components, class components, and task components, processes, functions, attributes, procedures, sub-routines, segments of a program code, drivers, firmware, microcodes, circuits, data, databases, data structures, tables, arrays, and parameters. Components and features provided by units may be combined into a smaller number of components and a smaller number of units, or may be divided into a greater number of components and a greater number of units. In addition, components and units may be implemented such that they play one or more central processing units (CPUs) in a device or a secure multimedia card (MMC).

Figure 16:
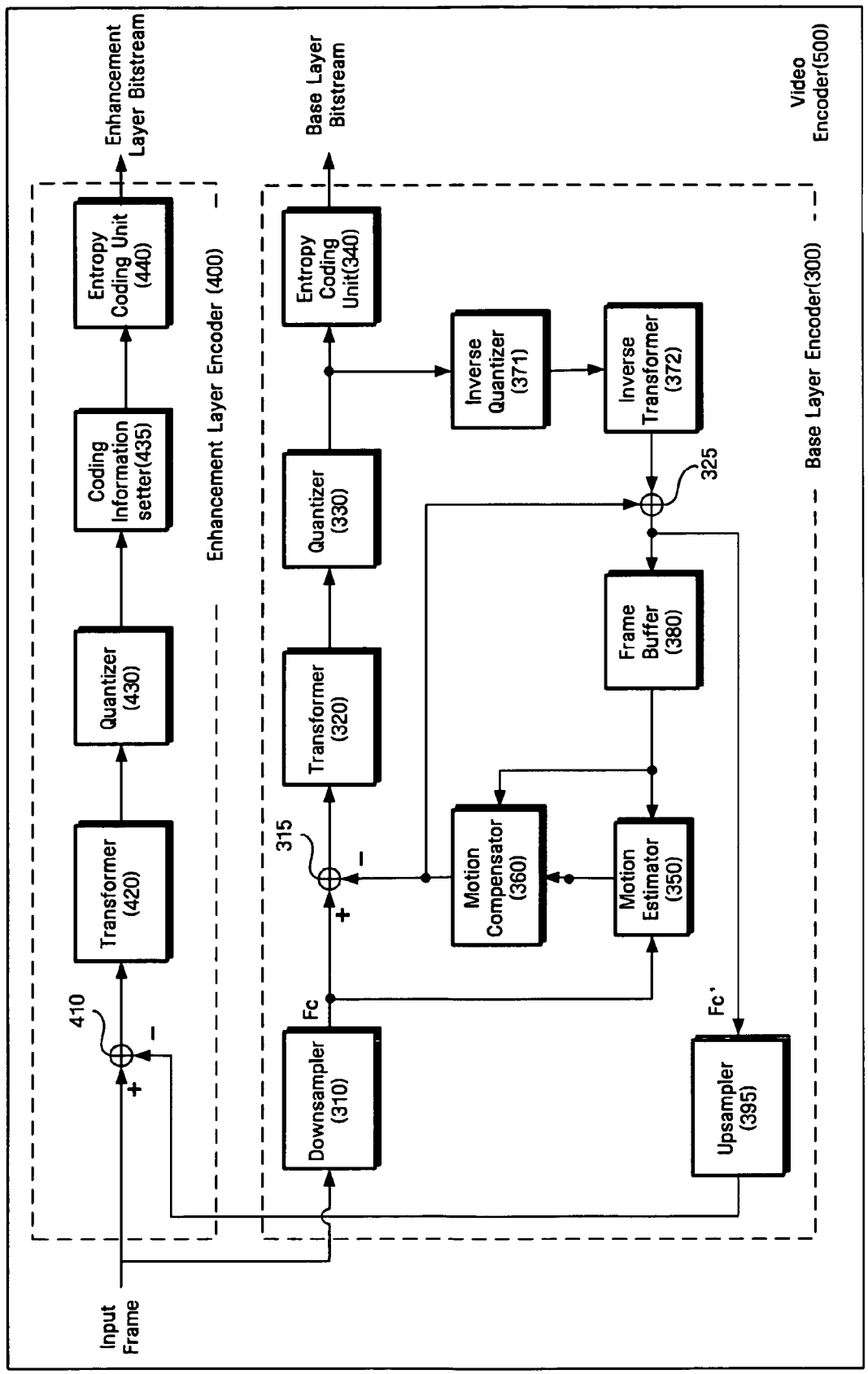
FIG. 16 is a block diagram of a video encoder according to an exemplary embodiment of the present invention.
Figure 17:
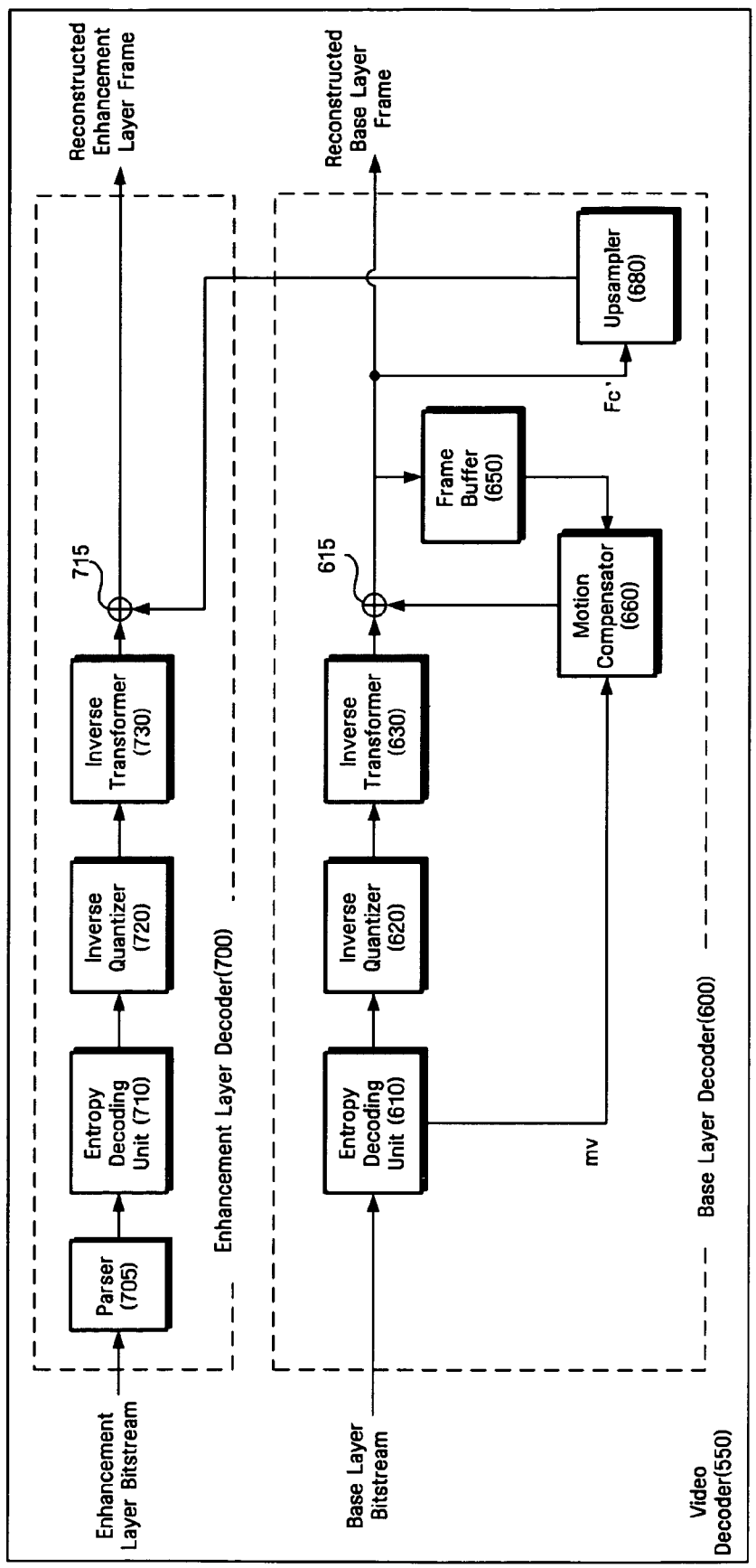
FIG. 17 is a block diagram of a video decoder according to an exemplary embodiment of the present invention.

FIG. 16 is a block diagram of a video encoder 500 according to an exemplary embodiment of the present invention and FIG. 17 is a block diagram of a video decoder 550 according to an exemplary embodiment of the present invention. While the present invention will be described with reference to FIGS. 16 and 17 with regard to a case of using one base layer and one enhancement layer, two or more layers can be used. It will be understood by those skilled in the art that and the present invention can also be applied between a current layer and a lower layer.

Referring to FIG. 16, the video encoder 500 mainly includes an enhancement layer encoder 400 and a base layer encoder 300. The configuration of the base layer encoder 300 will now be described.

A downsampler 310 downsamples an input video according to the resolution, frame rate or video image size of a base layer. An MPEG downsampler or a wavelet downsampler may be used to downsample the input frame to the resolution of the base layer. A frame scheme or frame interpolation scheme may be simply used to change the frame rate for downsampling. Downsampling an image to a smaller size can be accomplished by removing information in a boundary region from video information or reducing the size of video information to match the size of a screen. For example, downsampling may be performed to resize an original input video with 16:9 aspect ratio to 4:3.

A motion estimator 350 performs motion estimation on a base layer frame to obtain a motion vector mv for each partition in the base layer frame. The motion estimation is the process of finding a region in a previous reference frame Fr' stored in a frame buffer 380, which is most similar to each partition in a current frame Fc and has a minimum matching error. Various techniques such as hierarchical parameter size block matching (HVSBM) or fixed-size block matching algorithm may be used for motion estimation. The reference frame Fr' may be provided by the frame buffer 380. Although in the above description, the base layer encoder 300 supports closed-loop coding using a reconstructed frame as a reference frame, it may employ an open-loop coding scheme using an original base layer frame provided by the downsampler 310 as a reference frame.

The motion compensator 360 performs motion compensation on the reference frame using the motion vector mv. A subtractor 315 subtracts the motion-compensated reference frame from the base layer current frame Fc in order to generate a residual frame.

A transformer 320 performs spatial transform on the residual frame to create a transform coefficient. The spatial transform method may include Discrete Cosine Transform (DCT), or wavelet transform. Specifically, DCT coefficients may be created in a case where DCT is employed, and wavelet coefficients may be created in a case where wavelet transform is employed.

A quantizer 330 quantizes the transform coefficient received from the transformer 320. Quantization means the process of expressing the transform coefficients formed in arbitrary real values by discrete values, and matching the discrete values with indices according to the predetermined quantization table. The quantized result value is referred to as a quantized coefficient.

An entropy coding unit 340 losslessly encodes the quantization coefficient obtained by the quantizer 330 and the motion vector mv obtained by the motion estimator 350 into a base layer bitstream. There are a variety of lossless coding methods including arithmetic coding, parameter length coding, and the like.

An inverse quantizer 371 applies inverse quantization to the quantization coefficient received from the quantizer 330. Inverse quantization means an inverse quantization process to restore values matched to indices generated during quantization according to a predetermined quantization table used in the quantization.

An inverse transformer 372 performs inverse transform on the inversely quantized result. Inverse spatial transform may be, for example, inverse DCT or inverse wavelet transform, performed in a reverse order to that of transformation performed by the transformer 320.

An adder 325 adds together the output values of the motion compensator 360 and inverse transformer 372 in order to reconstruct a current frame Fc' that is then sent to the frame buffer 380. The frame buffer 380 temporarily stores the reconstructed frame Fc' and provides the same as a reference frame for inter prediction on a subsequent base layer frame.

The reconstructed frame Fc' is fed to the enhancement layer encoder 400 after passing through an upsampler 395. Of course, if the base layer has the same resolution as an enhancement layer, the upsampling may be skipped.

The configuration of the enhancement layer decoder 400 will now be described. A frame received from the base layer encoder 300 and an input frame is fed to a subtractor 410. The subtractor 410 calculates a difference between the input frame and the base layer frame containing the virtual region in order to generate a residual frame. The residual frame passes through a transformer 420, a quantizer 430, and an entropy coding unit 440 before being transformed into an enhancement layer bitstream.

The transformer 420 performs spatial transform on the residual signal between a macroblock in the input frame and a macroblock in the base layer frame to create a transform coefficient. Discrete Cosine Transform (DCT) or wavelet transform technique may be used for the spatial transform. DCT coefficients (in the case of DCT) or wavelet coefficients (in the case of wavelet transform) have similarity due to the characteristics of the enhancement layer macroblock. Thus, the transformer 420 removes similarity among those coefficients to increase compression ratio.

Since the quantizer 430 performs the same function/operation as its counterpart in the base layer encoder 300, detailed description thereof will not be given. A bitstream output from the quantizer 430 is set by a coding information setting unit 435 in such a way as to efficiently encode the residual prediction flag before being coded by an entropy coding unit 440.

As described above, as to information about whether or not data of a base layer frame is to be referred by enhancement layer data, the coding information setting unit 435 determines a difference between prediction data and the prediction result, thereby preventing loss of information that is to be coded by and delivered from the entropy coding unit 440. The bit allocation process for compression performed in the transformer 420 is as described in the processes of predicting residual data (see FIGS. 4, 9, 11, 13 and 14) and of predicting motion vector (see FIG. 7). For example, if the energy of residual data in a base layer or FGS layer is 0 or the CBP value is 0, the coding information setting unit 435 does not encode the residual prediction flag because prediction of base layer residual data is not required; otherwise, it encodes the residual prediction flag. If the energy of residual data in a base layer or FGS layer or the CBP value is not 0, it is highly likely that the residual prediction flag is 1. As described above with reference to FIGS. 4, 9, 11, 13 and 14, the residual prediction flag is coded considering coding efficiency.

When the coding process illustrated in FIG. 14 is applied, if the energy of base layer residual data or the CBP value is 0, which means that the residual prediction flag is 0, the coding information setting unit 435 sets a probability value for a CABAC context model so that the probability of being '0' is higher than being '1'. Conversely, if the energy of base layer residual data or the CBP value is not 0, which means that it is very likely that the residual prediction flag has a value of 1, the coding information setting unit 435 sets a probability value for a CABAC context model so that the probability of being '1' is higher than being '0.' In one exemplary embodiment, as described above, the coding information setting unit 435 may set ctxIdxInc to 0 or 1.

The entropy coding unit 440 performs coding on enhancement layer data using the information set by the coding information setting unit 435. Because the entropy coding unit 440 performs the same functions/operations as the entropy coding unit 340 in the base layer encoder 300 except for this operation, their description will be omitted.

The enhancement layer encoder 400 illustrated in FIG. 16 can predict whether data of a base layer frame is to be referred to during an encoding process by data that can refer to the base layer frame, e.g., residual data or a motion vector.

FIG. 17 is a block diagram of a video decoder according to an embodiment of the present invention. The video decoder 550 mainly includes an enhancement layer encoder 700 and a base layer encoder 600. The configuration of the base layer encoder 600 will now be described.

An entropy decoding unit 610 losslessly decodes a base layer bitstream to extract texture data and motion data (e.g., motion vector, partition information, reference frame number, etc.) in a base layer frame.

An inverse quantizer 620 inversely quantizes the texture data. The inverse quantization is the inverse of the quantization performed in the video encoder 500 and is the process of reconstructing values from corresponding quantization indices created during a quantization process using a quantization table used during the quantization process.

An inverse transformer 630 performs inverse spatial transform on the inversely quantized result to reconstruct a residual frame. The inverse spatial transform is the inverse process of the spatial transform performed by the transformer 320 in the video encoder 500. Inverse DCT or inverse wavelet transform may be used for the inverse spatial transform.

The entropy decoding unit 610 also provides the motion data including motion vector mv to a motion compensator 660.

The motion compensator 660 performs motion compensation on a previously reconstructed video frame, i.e., a reference frame, provided by the frame buffer 650 to generate a motion-compensated frame.

An adder 615 adds together the residual frame reconstructed by the inverse transformer 630 and the motion-compensated frame generated by the motion compensator 660 in order to reconstruct a base layer video frame. The reconstructed video frame can be temporarily stored in the frame buffer 650 and can be provided to the motion compensator 660 for reconstruction of subsequent frames.

The reconstructed current frame Fc' is fed to the enhancement layer decoder 700 after passing through an upsampler 680. Thus, if a base layer has the same resolution as an enhancement layer, the upsampling may be skipped. If the base layer video information has no information about a region that is present in enhancement layer video information, the upsampling may also be skipped.

The configuration of the enhancement layer decoder 700 will now be described. An entropy decoding unit 710 losslessly decodes an input enhancement layer bitstream to extract texture data for unsynchronized frame.

Then, the extracted texture data is reconstructed into a residual frame as it passes through an inverse quantizer 720 and an inverse transformer 730. The inverse quantizer 720 performs similar functions/operations to the inverse quantizer 620 in the base layer decoder 600.

An adder 715 adds the reconstructed residual frame to the base layer frame provided by the base layer decoder 600 in order to reconstruct a frame.

The process illustrated in FIG. 5, 8, 10, 12, or 15 may be performed for the inverse transformer 730 in the enhancement layer decoder 700 to reconstruct the residual frame. In order to determine whether decoded data of a decoded base layer frame is referred to by enhancement layer data, a check is made on residual data or motion data constituting a base layer frame. If base layer residual data is smaller than Threshold$_{residual}$, as described above with reference to FIG. 5, the residual prediction flag is set to 0 because the base layer residual data is not referred to by the enhancement layer residual data. Furthermore, as described above with reference to FIG. 8, the motion prediction flag may be set to 0 because a base layer motion vector may not be referred to if a difference between the base layer motion vector and a motion vector from a spatially adjacent region is smaller than Threshold$_{Motion}$.

Alternatively, as described above with reference to FIG. 10, 12, or 15, it can be determined whether base layer residual data can be referred to in predicting enhancement layer residual data depending on whether the energy of the base layer residual data or the CBP value is 0. Because an encoder performs coding using various techniques to increase coding efficiency, the residual prediction flag can be obtained using a decoding method corresponding to an appropriate coding method.

If the decoding process illustrated in FIG. 15 is applied, a parser 705 obtains a CBP value from an enhancement layer bitstream to check whether a value of 1 exists within the bit.

The parser 705 can determine whether residual data has non-zero pixels based on the coded block pattern. Since this process is the same as illustrated in FIG. 15, a detailed description thereof will not be given.

The parser 705 can determine whether the residual data has non-zero pixels using baseResidualAvailLuma8×8Blk[0 . . . 3] and baseResidualAvailChroma as well. The parser 705 obtains a CBP bit to assign 4 less significant bits and 2 more significant bits to CodedBlockPatternLuma and CodedBlockPatternChroma, respectively. Then, the parser 705 checks whether at least one of the four bits in CodedBlockPatternLuma has a value of 1 and the value of CodedBlockPatternChroma is greater than 0. If at least one of the four bits has a value of 1 or the value of CodedBlockPatternChroma is greater than 0, the parser 705 determines that the residual data has at least one non-zero pixel and sets the value of ctxIdxInc to 1; otherwise, it sets the value of ctxIdxInc to 0. The entropy decoding unit 710 performs entropy decoding using the value of ctxInxInc set by the parser 705.

While in the above description, the enhancement layer decoder 700 shown in FIG. 17 performs decoding using Intra BL prediction from a base layer frame, it will be understood by those skilled in the art that decoding may be performed by inter prediction or intra prediction technique as described with reference to FIG. 2.

The present invention provides an increased compression ratio by determining whether enhancement layer data is predicted from base layer frame.

It will be apparent to those skilled in the art that various modifications and changes may be made thereto without departing from the scope and spirit of the invention. Therefore, it should be understood that the above embodiment is not restrictive but illustrative in all aspects. The scope of the present invention is defined by the appended claims rather than the detailed description of the invention. All modifications and changes derived from the scope and spirit of the claims and equivalents thereof should be construed to be included in the scope of the present invention.

What is claimed is:

1. A method of coding information about a residual prediction flag indicating whether residual data of a current layer image of a multi-layered video signal is predicted from residual data of a lower layer image corresponding to the residual data of the current layer image, the method comprising:

determining characteristic data of the lower layer image, wherein the characteristic data comprises at least one of energy of the residual data of the lower layer image and a value of a coded block pattern (CBP) of the lower layer image; and coding the information about the residual prediction flag according to the characteristic data, wherein if the characteristic data is not smaller than a predetermined threshold, the residual prediction flag is set and the coding the information about the residual prediction flag comprises coding a subtraction difference between the residual prediction flag and a selected value used for predicting the residual prediction flag.

2. The coding method of claim 1, wherein if the characteristic data is smaller than the predetermined threshold, the coding the information about the residual prediction flag is skipped.

3. The coding method of claim 1, wherein the selected value used for predicting the residual prediction flag is '1' or '0' depending on a difference between a motion vector of the current layer and a corresponding motion vector of the lower layer.

4. The coding method of claim 1, wherein the coding the information about the residual prediction flag further comprises coding the selected value used for predicting the residual prediction flag.

5. The coding method of claim 1, wherein the lower layer comprises one of a base layer and a fine granularity scalability (FGS) layer.

6. The coding method of claim 1, wherein the energy of the residual data of the lower layer image comprises a number of non-zero pixels in the lower layer image, and
wherein the value of the CBP of the lower layer image comprises a number of bits in the CBP having a value of '1'.

7. The coding method of claim 1, wherein the value of the CBP comprises values of four (4) less significant bits of the CBP for luminance information and two (2) more significant bits of the CBP for chrominance information.

8. The coding method of claim 1, wherein the determining the energy of the residual data comprises summing up energy of the lower layer that is referred to by the current layer.

9. The coding method of claim 1, wherein the determining the CBP of the lower layer image comprises determining whether each bit of the CBP in the lower layer image has a value of '1'.

10. A method of decoding information about a residual prediction flag indicating whether residual data of a current layer image of a multi-layered video signal is predicted from residual data of a lower layer image corresponding to the residual data of the current layer image, the method comprising:
determining characteristic data of the lower layer image, wherein the characteristic data comprises at least one of energy of the residual data of the lower layer image and a value of a coded block pattern (CBP) of the lower layer image; and
decoding the information about the residual prediction flag to obtain the residual prediction flag, according to the characteristic data,
wherein if the characteristic data is not smaller than a predetermined threshold, the decoding the information about the residual prediction flag comprises decoding a subtraction difference, which is coded, between the residual prediction flag and a selected value used for predicting the residual prediction flag.

11. The decoding method of claim 10, wherein, if the characteristic data is smaller than the predetermined threshold, the residual prediction flag is set to '0' without decoding the information about the residual prediction flag.

12. The decoding method of claim 10, wherein the selected value used for predicting the residual prediction flag is '1' or '0' depending on a difference between a motion vector of the current layer and a corresponding motion vector of the lower layer.

13. The decoding method of claim 10, wherein the decoding the information about the residual prediction flag further comprises decoding the selected value used for predicting the residual prediction flag.

14. The decoding method of claim 10, wherein the lower layer comprises one of a base layer and a fine granularity scalability (FGS) layer.

15. The decoding method of claim 10, wherein the energy of the residual data of the lower layer image comprises a number of non-zero pixels in the lower layer image, and
wherein the value of the CBP of the lower layer image comprises a number of bits in the CBP having a value of '1'.

16. The decoding method of claim 10, wherein the value of the CBP comprises values of four (4) less significant bits of the CBP for luminance information and two (2) more significant bits of the CBP for chrominance information.

17. The decoding method of claim 10, wherein the determining the energy of the residual data comprises summing up energy of the lower layer that is referred to by the current layer.

18. The decoding method of claim 10, wherein the determining the CBP of the lower layer image comprises determining whether each bit of the CBP in the lower layer image that is referred to by the enhancement layer has a value of '1'.

19. A video encoder for coding information about a residual prediction flag indicating whether residual data of a current layer image of a multi-layered video signal is predicted from residual data of a lower layer image corresponding to the residual data of the current layer image, the encoder comprising:
a processor comprising a non-transitory computer readable medium;
a lower layer encoding unit which generates characteristic data of the lower layer image, wherein the characteristic data comprises at least one of energy of the residual data of the lower layer image and a value of a coded block pattern (CBP) of the lower layer image;
a current layer encoding unit which codes the information about the residual prediction flag to obtain the residual prediction flag according to the characteristic data, according to instructions of the processor,
wherein if the characteristic data is not smaller than a predetermined threshold, the residual prediction flag is set and the current layer encoding unit codes the information about the residual prediction flag comprising a subtraction difference between the residual prediction flag and a selected value used for predicting the residual prediction flag.

20. The video encoder of claim 19, wherein if the characteristic data is smaller than the predetermined threshold, the current layer encoding unit skips the coding the information about the residual prediction flag.

21. The video encoder of claim 19, wherein the selected value used for predicting the residual prediction flag is '1' or '0' depending on a difference between a motion vector of the current layer and a corresponding motion vector of the lower layer.

22. The video encoder of claim 19, wherein the information about the residual prediction flag further comprises the selected value used for predicting the residual prediction flag.

23. The video encoder of claim 19, wherein the lower layer comprises one of a base layer and a fine granularity scalability (FGS) layer.

24. The video encoder of claim 19, wherein the energy of the residual data of the lower layer image comprises a number of non-zero pixels in the lower layer image; and
wherein the value of the CBP of the lower layer image comprises a number of bits in the CBP having a value of '1'.

25. The video encoder of claim 19, wherein the value of the CBP comprises values of four (4) less significant bits of the CBP for luminance information and two (2) more significant bits of the CBP for chrominance information.

26. A video decoder for decoding information about a residual prediction flag indicating whether residual data of a current layer image of a multi-layered video signal is predicted from residual data of a lower layer image corresponding to the residual data of the current layer image, the decoder comprising:
- a processor comprising a non-transitory computer readable medium;
- a lower layer decoding unit which generates characteristic data of the lower layer image, wherein the characteristic data comprises at least one of energy of the residual data of the lower layer image and a value of a coded block pattern (CBP) of the lower layer image; and
- a current layer decoding unit which decodes the information about the residual prediction flag to obtain the residual prediction flag, according to the characteristic data, according to instructions of the processor,
- wherein if the characteristic data is not smaller than a predetermined threshold, the current layer decoding unit decodes the information about the residual prediction flag comprising a subtraction difference, which is coded, between the residual prediction flag and a selected value used for predicting the residual prediction flag.

27. The video decoder of claim 26, wherein if the characteristic data is smaller than the predetermined threshold, the residual prediction flag is set to "0" without decoding the information about the residual prediction flag.

28. The video decoder of claim 26, wherein the selected value used for predicting the residual prediction flag is '1' or '0' depending on a difference between a motion vector of the current layer and a corresponding motion vector of the lower layer.

29. The video decoder of claim 26, wherein the information about the residual prediction flag further comprises the selected value used for predicting the residual prediction flag.

30. The video decoder of claim 26, wherein the lower layer comprises one of a base layer and a fine granularity scalability (FGS) layer.

31. The video decoder of claim 26, wherein the energy of the residual data of the lower layer image comprises a number of non-zero pixels in the lower layer image, and
- wherein the value of the CBP of the lower layer image comprises a number of bits in the CBP having a value of '1'.

32. The video decoder of claim 26, wherein the value of the CBP comprises values of four (4) less significant bits of the CBP for luminance information and two (2) more significant bits of the CBP for chrominance information.

33. A coding method performed by a multi-layered video encoder, the coding method comprising:
- obtaining a lower layer from an input signal;
- obtaining energy of residual data of the lower layer; and
- coding data of the current layer according to the energy of the residual data of the lower layer,
- wherein if the energy is not smaller than a predetermined threshold, the coding the data of the current layer comprises:
  - setting determination information used for predicting prediction information indicating whether the residual data of the lower layer is referred to by the current layer; and
  - coding the data of the current layer using the determination information and a subtraction difference between the determination information and the prediction information.

34. The coding method of claim 33, wherein, in the coding the data of the current layer, if the energy is not smaller than the predetermined threshold, the determination information and the subtraction difference between the determination information and the prediction information are coded along with the data of the current layer.

35. The coding method of claim 33, wherein if the energy is smaller than the predetermined threshold, the coding the data of the current layer is performed without performing the setting the determination information and without using the determination information and the subtraction difference between the determination information and the prediction information.

36. The coding method of claim 33, wherein the predetermined threshold is a value obtained when the energy of the residual data is '0'.

37. The coding method of claim 33, further comprising:
- obtaining a motion vector of the lower layer and a corresponding motion vector of the current layer;
- calculating a difference between the motion vector of the lower layer and the corresponding motion vector of the current layer,
- wherein the determination information is differently set according to the difference between the motion vector of the lower layer and the corresponding motion vector of the current layer, and
- wherein, in the coding the data of the current layer, if the energy is not smaller than the predetermined threshold, the determination information and the subtraction difference between the determination information and the prediction information are coded along with the data of the current layer.

38. The coding method of claim 33, wherein the coding the data of the current layer is performed by entropy coding.

39. The coding method of claim 33, wherein the data of the current layer is data of a macroblock, a slice or a frame of the current layer.

40. A coding method performed by a multi-layered video encoder, the coding method comprising:
- obtaining a difference between a motion vector of a region in a lower layer and a motion vector of a spatially adjacent region in the lower layer;
- coding data of a current layer based on the difference, wherein:
- if the difference is smaller than a first predetermined threshold, the coding the data of the current layer comprises coding the data of the current layer without prediction information indicating whether the motion vector of the region in the lower layer is referred to for predicting a motion vector of a corresponding region in the current layer; and
- if the difference is not smaller than the first predetermined threshold, the coding the data of the current layer comprises coding the data of the current layer data and a subtraction difference between the prediction information and determination information used for predicting the prediction information.

41. The coding method of claim 40, wherein the first predetermined threshold is a value obtained when the residual between the two motion vectors is '0'.

42. The coding method of claim 40, further comprising:
- determining whether the difference between the motion vector of the region in the lower layer and the motion vector of the spatially adjacent region in the lower layer is not smaller than a second predetermined threshold; and
- setting the determination information differently according to the determining.

43. A decoding method performed by a multi-layered video decoder, the decoding method comprising:
- decoding a lower layer of an input signal;
- obtaining energy of residual data of the lower layer; and decoding the data of a current layer according to the energy of the residual data of the lower layer,
wherein if the energy is not smaller than a predetermined threshold, the decoding the data of the current layer comprises:
obtaining determination information used for predicting prediction information indicating whether the residual data of the lower layer is referred to by the current layer; and
decoding the data of the current layer using the determination information and a subtraction difference between the determination information and prediction information about whether the residual data is referred to by the current layer.

44. The decoding method of claim 43, wherein, the using the determination information and the subtraction difference between the determination information and the prediction information comprises decoding the determination information and the subtraction difference between the determination information and the prediction information, which are coded.

45. The decoding method of claim 43, wherein if the energy is smaller than the predetermined threshold, the decoding the data of the current layer comprises:
setting the prediction information as a value indicating that the residual data of the lower layer is not referred to by the current layer when the data of the current layer is encoded; and
decoding the data of the current layer using the value.

46. The decoding method of claim 43, wherein the predetermined threshold is a value obtained when the energy of the residual data is '0'.

47. The decoding method of claim 43,
wherein the determination information is differently set according to a difference between a motion vector of the lower layer and a corresponding motion vector of the current layer.

48. The decoding method of claim 43, wherein the decoding the data of the current layer is performed by entropy decoding.

49. The decoding method of claim 43, wherein the data of the current layer is data of a macroblock, a slice, or a frame.

50. A decoding method performed by a multi-layered video decoder, the decoding method comprising:
obtaining a difference between a motion vector of a region in a lower layer and a motion vector of a spatially adjacent region in the lower layer; and
decoding data of a current layer based on the difference between the motion vectors, wherein:
if the difference between the motion vectors is smaller than a first predetermined threshold, the decoding the data of the current layer does not use the prediction information indicating whether the motion vector of the region in the lower layer is referred to for predicting a motion vector of a corresponding region in the current layer; and
if the difference between the motion vectors is not smaller than the first predetermined threshold, the decoding the data of the current layer comprises decoding the data of the current layer and determination information used for predicting the prediction information and a subtraction difference between the determination information and the prediction information.

51. The decoding method of claim 50, wherein the determination information is set differently according to whether the difference is not smaller than a second predetermined threshold.

52. The decoding method of claim 50, wherein the first predetermined threshold is a value obtained if the residual between the two motion vectors is '0'.

53. A video encoder comprising:
a processor comprising a non-transitory computer readable medium;
a lower layer encoder which encodes a lower layer of an input signal; and
a current layer encoder which encodes data of the current layer according to energy of residual data of the lower layer, according to instructions of the processor,
wherein if the energy is not smaller than a predetermined threshold, the current layer encoder sets determination information used for predicting prediction information indicating whether the residual data of the lower layer is referred to by the current layer, and encodes the data of the current layer using the determination information and a subtraction difference between the determination information and the prediction information.

54. The encoder of claim 53, wherein, in the encoding the data of the current layer, if the energy is not smaller than the predetermined threshold, the current layer encoder encodes the determination information and the subtraction difference between the determination information and the prediction information along with the data of the current layer.

55. The encoder of claim 53, wherein
if the energy is smaller than the predetermined threshold, the current layer encoder encodes the data of the current layer without setting the determination information and without using the determination information and the subtraction difference between the determination information and the prediction information.

56. The encoder of claim 53, wherein the predetermined threshold is a value obtained when the energy of the residual data is '0'.

57. The encoder of claim 53, wherein the current layer encoder calculates a difference between a motion vector of the lower layer and a corresponding motion vector of the current layer, and sets the determination information differently according to the difference between the motion vectors,
wherein if the energy is not smaller than the predetermined threshold, the current layer encoder encodes the determination information and the subtraction difference between the determination information and the prediction information along with the data of the current layer.

58. The encoder of claim 53, wherein the encoding the data of the current layer is entropy coding.

59. The encoder of claim 53, wherein the data of the current layer is data of a macroblock, a slice, or a frame of the current layer.

60. A video encoder comprising:
a processor comprising a non-transitory computer readable medium;
a lower layer encoder which encodes data of a lower layer; and
a current layer encoder which encodes data of a current layer based on a difference between a motion vector of a region of the lower layer image and a motion vector of a spatially adjacent region in the lower layer, according to instructions of the processor, wherein:
if the difference is smaller than a first predetermined threshold, the current layer encoder encodes the data of the current layer without prediction information indicating whether the motion vector of the region in the lower layer is referred to in predicting the motion vector of a corresponding region in the current layer; and if the difference is not smaller than the first predetermined threshold, the current layer encoder encodes the data of the current layer and a subtraction difference between the prediction information and determination information used for predicting the prediction information.

61. The encoder of claim 60, wherein the first predetermined threshold is a value obtained when the residual between the two motion vectors is '0'.

62. The encoder of claim 60,
wherein the current layer encoder determines whether the difference between the motion vector of the region in the lower layer and the motion vector of the spatially adjacent region in the lower layer is not smaller than a second predetermined threshold, and sets the determination information differently according to the determining.

63. A video decoder comprising:
a processor comprising a non-transitory computer readable medium;
a lower layer decoder which decodes data of a lower layer; and
a current layer decoder which decodes data of a current layer by referring to energy of residual data of the lower layer, according to instructions of the processor,
wherein if the energy is not smaller than a predetermined threshold, the current layer decoder obtains determination information used for predicting prediction information indicating whether the residual data of the lower layer is referred to by the current layer, and decodes the data of the current layer using the determination information and a subtraction difference between the determination information and the prediction information.

64. The decoder of claim 63, wherein the current layer decoder decodes the determination information and the subtraction difference between the determination information and the prediction information, which are coded, to decode the data of the current layer.

65. The decoder of claim 63, wherein if the energy is smaller than the predetermined threshold, the current layer decoder sets the prediction information as a value indicating that the residual data of the lower layer image is not referred to by the current layer data when the data of the current layer is encoded, and decodes the data of the current layer using the value.

66. The decoder of claim 63, wherein the predetermined threshold is a value obtained when the energy of the residual data is '0'.

67. The decoder of claim 63, wherein the determination information is differently set according to a difference between a motion vector of the lower layer and a corresponding motion vector of the current layer.

68. A video decoder comprising:
a processor comprising a non-transitory computer readable medium;
a lower layer decoder which decodes data of a lower layer; and
a current layer decoder which decodes data of a current layer according to a difference between a motion vector of a region in the lower layer image and a motion vector of a spatially adjacent region in the lower layer, according to instructions of the processor, wherein:
if the difference is smaller than a first predetermined threshold, the current layer decoder decodes the data of the current layer does without using prediction information indicating whether the motion vector of the region in the lower layer is referred to in predicting a motion vector of the current layer; and
if the difference is not smaller than the first predetermined threshold, the current layer decoder decodes the data of the current layer and determination information used for predicting the prediction information and a subtraction difference between the determination information and the prediction information.

69. The decoder of claim 68, wherein the determination information is set differently according to whether the difference is not smaller than a second predetermined threshold.

70. The decoder of claim 68, wherein the decoding the data of the current layer performed by the currently layer decoder is entropy decoding.

71. The decoder of claim 68, wherein the data of the current layer is data of a macroblock, a slice, or a frame.

72. The decoder of claim 68, wherein the first predetermined threshold is a value obtained when the residual between the two motion vectors is '0'.

* * * * *